(12) United States Patent
Hathiramani et al.

(10) Patent No.: US 12,739,889 B2
(45) Date of Patent: Sep. 15, 2026

(54) RANDOM ACCESS

(71) Applicant: Nokia Technologies Oy, Espoo (FI)

(72) Inventors: Navin Hathiramani, Dallas, TX (US); Thomas Deiss, Ulm (DE)

(73) Assignee: Nokia Technologies Oy, Espoo (FI)

( * ) Notice: Subject to any disclaimer, the term of this patent is extended or adjusted under 35 U.S.C. 154(b) by 343 days.

(21) Appl. No.: 18/545,450

(22) Filed: Dec. 19, 2023

(65) Prior Publication Data

US 2025/0203660 A1 Jun. 19, 2025

(51) Int. Cl.
*H04W 74/0833* (2024.01)
*H04W 16/28* (2009.01)
*H04W 56/00* (2009.01)

(52) U.S. Cl.
CPC ....... *H04W 74/0833* (2013.01); *H04W 16/28* (2013.01); *H04W 56/0015* (2013.01)

(58) Field of Classification Search
CPC ............. H04W 74/0833; H04W 16/28; H04W 56/0015; H04W 74/006; H04B 7/0695
See application file for complete search history.

(56) References Cited

U.S. PATENT DOCUMENTS 11,595,992 B2 2/2023 Kim et al.
2023/0403746 A1 12/2023 Yang et al.
2025/0097982 A1 * 3/2025 Abotabl ............. H04W 72/046

OTHER PUBLICATIONS

"3rd Generation Partnership Project; Technical Specification Group Radio Access Network; NR; Physical layer procedures for control (Release 17)", 3GPP TS 38.213, V17.6.0, Jun. 2023, pp. 1-262.
"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.
"3rd Generation Partnership Project; Technical Specification Group Radio Access Network; NR; Physical channels and modulation (Release 17)", 3GPP TS 38.211, V17.5.0, Jun. 2023, pp. 1-136.
"3rd Generation Partnership Project; Technical Specification Group Radio Access Network; NR; Medium Access Control (MAC) protocol specification (Release 17)", 3GPP TS 38.321, V17.5.0, Jun. 2023, pp. 1-253.
"3rd Generation Partnership Project; Technical Specification Group Radio Access Network; NR; NR and NG-RAN Overall Description; Stage 2 (Release 17)", 3GPP TS 38.300, V17.6.0, Sep. 2023, pp. 1-211.
"Slice specific RACH configurations", 3GPP TSG-RAN WG2 Meeting #115 Electronic, R2-2107506, Agenda item: 8.8.3, Nokia, Aug. 16-27, 2021, 5 pages.
"Considerations on BWP switching and multi-activation for NR-U", 3GPP TSG-RAN WG2 Meeting #103bis, R2-1815251, Agenda item: 11.2.1.2, CMCC, Oct. 8-12, 2018, 3 pages.
"RACH Configuration for NR", 3GPP TSG-RAN WG2#NR AdHoc#2, R2-1706685, Agenda Item: 10.3.1.4.1, InterDigital Inc., Jun. 27-29, 2017, pp. 1-3.
"Differentiation for SR-triggered Random Access", 3GPP TSG-RAN WG2 NR #99, R2-1708966, Agenda item: 10.3.1.4.1, Huawei, Aug. 21-25, 2017, 2 pages.

(Continued)

*Primary Examiner* — Said M Elnoubi
(74) *Attorney, Agent, or Firm* — Nokia Technologies Oy

(57) ABSTRACT

Methods, apparatuses and systems random access in a communication network are disclosed.

10 Claims, 10 Drawing Sheets

(56) References Cited

OTHER PUBLICATIONS

“PRACH Resources for NR”, 3GPP TSG-RAN WG2 Meeting #98, R2-1704909, Agenda Item: 10.3.1.4, InterDigital Inc., May 15-19, 2017, pp. 1-2.
International Search Report and Written Opinion received for corresponding Patent Cooperation Treaty Application No. PCT/EP2024/078652, dated Dec. 20, 2024, 13 pages.
“Random access procedure in NR”, 3GPP TSG RAN WG2 Meeting Ad Hoc, R2-1700203, Agenda Item: 3.2.1.4, CATT, Jan. 17-19, 2017, pp. 1-3.
“Beamforming impact on random access”, 3GPP TSG-RAN WG2 #98, R2-1704099, Agenda Item: 10.3.1.4, Ericsson, May 15-19, 2017, pp. 1-4.

* cited by examiner

RANDOM ACCESS

TECHNOLOGICAL FIELD

The present disclosure is related to but is not limited to communication networks as defined by the 3GPP standard, such as the 6G standard. The disclosure in particular relates to the use of a random access channel (RACH) and a random access (RA) procedure (also referred to as RACH procedure). More specifically, the disclosure relates to the physical layer design in the context of RA procedures, i.e. the random access channel resource allocation and the design of RACH occasions (ROs). In particular, the disclosure relates to adapting RACH resources to at least one beam provided by a network node.

BACKGROUND

A random access (RA) procedure enables user equipment (UE) to initiate a connection with a (e.g., wireless communication) network, e.g., for transmitting mobile-originating data or in response to a paging message for receiving mobile-terminating data. The RA procedure is a procedure present in earlier versions of mobile systems including GSM, GPRS, UMTS and LTE, with some changes in messages exchanged between the UE and the network. This procedure is not limited to connection initiation and may be performed for various different reasons, such as a handover to a target cell, the need for uplink synchronization, a scheduling request when no uplink (UL) resources are reserved for the UE (no scheduling request), for beam recovery and/or combinations thereof.

SUMMARY OF SOME EXAMPLE EMBODIMENTS

Random access may be performed in a beam-based fashion, in particular but not only in New Radio (NR, 5G). This may be referred to as beam-based (random) access. With this, the control channels such as Physical Downlink Control CHannel (PDCCH), Physical Random Access CHannel (PRACH), Physical Uplink Control CHannel (PUCCH) may be beamformed, e.g., in addition to data plane channels such as Physical Downlink Shared CHannel (PDSCH), Physical Uplink Shared CHannel (PUSCH). This beam-based access allows NR cells to increase control channel link budgets, thereby increasing the cell edge coverage. With beam-based access, a UE may select a beam provided by a serving cell based on e.g., measurements of at least one or multiple beam (e.g., synchronization signal block, SSB beams) of the cell. The UE may (e.g., then) initiate a RACH procedure based on a (e.g., cell-level) RACH configuration and a (e.g., cell-level) RACH occasion. The RACH occasion may accommodate a RA preamble to transmit by the UE. The RACH occasion may be determined by the UE based on information provided by the network node (e.g., cell). The information may indicate transmitted and/or provided SSBs, a beam (e.g., SSB) index of the UE selected beam and/or a RACH configuration.

RACH configurations may encompass at least one or more parameters which for example define the RACH format to be used, how RA preambles are derived based on a root sequence, how the SSB beams are mapped to the different RACH occasions, a transmission power for RACH etc.

A RACH occasion may in some cases be limited to a maximum of 64 preambles and these preambles can be reserved for different purposes e.g., contention-based access vs contention-free based access or early indication of a particular UE capability, beam failure recovery etc. Having a high (e.g., spatial or temporal) density of users (e.g., user equipments, UEs) contending for RACH resources when transmitting RACH preambles in a given RACH occasion can lead to RACH collisions and (e.g., repeated) retransmissions.

It has been recognized that current specifications (i.e., 3GPP specifications) permit RACH configuration only at cell level. As a result, RACH resources for all beams (e.g., the beams provided by a network node provisioning beams in the cell) are dimensioned based on the needs of the beam with the highest RACH traffic. This serves the purpose to avoid excessive RACH preamble collisions across all beams (i.e., on any given beam, in particular the most-demanded beam). As one consequence, RACH configurations may be unnecessarily generous for less-demanded beams. This may lead to a waste in resources.

It has further been recognized that not all beams are equal in terms of spatial domain coverage and user (e.g., user equipment) distribution per beam. Cells may instead be configured with non-uniform beam patterns. Some beams may provide wider and/or larger area coverage and/or serve a coverage area with a high density of users (e.g., in proximity to the cell). Other beams may be targeted to users (e.g., much) further away from the cell (e.g., from the network node providing the cell, i.e. providing at least one beam of the cell) and may thus provide fewer UEs with coverage and may therefore receive less RA preambles per time. Beams may differ in their requirements regarding random access. For instance, beams targeting coverage at the cell edge would tend to have longer propagation times and may require more particularly robust RACH formats (e.g., guard time between preambles). In addition, see above, not all beams may have the same density of users (e.g., UEs).

It has been recognized that some cells (e.g., network nodes, e.g., cells provided by network nodes) capable of beamforming may employ a pattern where one central beam out of the N (e.g., six) beams possible is employed to target users (e.g., UEs) close to the cell with lower gains. The remaining N-1 (e.g., 5) beams may be targeted towards the cell edge. It has further been recognized that a large portion (e.g., the majority) of the users are close to the cell (which may be in line with planning and deployments guidelines for cellular networks). It has thus been recognized as advantageous to dedicate more capacity to the central beam in comparison to the others. Furthermore, given the differences in propagation time, RACH formats for the beam providing coverage close to the cell and the cell edge beams could be different. UL noise levels measured for different beams could also be different, hence having a single power ramping scheme (delta preamble) for all beams may not be optimal, leading to higher then needed interference.

It has been recognized that even when allowing for multiple RACH configurations (e.g., allowing different RACH formats), this may still not be flexible enough for future needs.

It has been recognized that optimization of RACH resources may be crucial when considering one of the following. The tendency is to request increased amount of RACH resources such that differentiated treatment can be provided to UEs right from initial access. Increased RACH resources lead to additional overheads. Interference caused by RACH preambles transmissions. Computing power required to process RACH preambles is limited. Furthermore, with the introduction of Multi RAT Spectrum Sharing (MRSS) in 6G this could lead to requiring more (e.g., double) the 5G RACH processing capability in a single distributed unit (DU) for MRSS cells. This may not be possible due to computing limitations. Also, additional RACH occasions for 6G would impact the available uplink (UL) capacity for 5G and 6G.

It is thus one of the objects of the disclosure to enable an improved allocation of RACH resources, in particular RACH occasions, in a multi-beam cell environment.

In view of the above, certain embodiments of the present disclosure propose an optimized way of random access channel configuration and/or resource allocation, for instance an optimized allocation of RACH occasions. Certain embodiments may resolve competing requirements of different beams provided by a network node.

According to a first example aspect, a method is disclosed, comprising: (e.g., while camping on a cell; for at least partially performing a random access procedure to a network node):

- determine a serving beam (i.e., beam-formed radio beam) (e.g., wherein the serving beam is associated to a beam index) (e.g., wherein the serving beam is a synchronization signal block, SSB, beam) (e.g., based on measurements, in particular measurements made by the apparatus),
- obtain (e.g., receiving at least one of as part of system information or from a network node) at least two (mutually different) sets of random access channel, RACH, configurations (e.g., specific to the network node), wherein at least one of the at least two sets of RACH configurations is a beam-specific set of RACH configurations, wherein (i.e., all) one or more RACH configurations of the beam-specific set of RACH configurations are beam-specific, wherein the beam-specific set of RACH configurations supports (e.g., only) a subset (i.e., a subset different from the entirety of beams, i.e. not all beams) (e.g., singular or plural of beams; configurations may be specific to one beam only) of beams of a (e.g., the one from which sets of RACH configurations/system information is received) network node,
- select one of the at least two sets of RACH configurations at least partially based on a selected beam (e.g., on the serving beam and/or on a selected beam) (e.g., at least partially based on a beam index of the respective beam, e.g., of a selected beam and/or of the determined serving beam),
- determine a RACH occasion at least partially based on at least one of the selected set of RACH configurations or the selected (e.g., or the serving) beam (i.e., based on configuration alone, serving beam alone or based on both (typical case)), and
- transmit a random access preamble using the (e.g., in the) determined RACH occasion.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a node in a communication system and/or by a user equipment (UE). For instance, the method may be performed and/or controlled by using at least one processor of the electronic device.

According to a further example aspect, a computer program is disclosed, the computer program when executed by a processor causing an apparatus, for instance a server, a network node or a UE, to perform and/or control the actions of the method according to the first example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-(e.g., only) Memory (ROM) or hard disk of a computer, or be intended for distribution of the program, like an optical disc.

According to a further example aspect, an apparatus is disclosed, configured to perform and/or control or comprising respective means for performing and/or controlling the method according to the first example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise (e.g., only) the disclosed components, for instance means, processor, memory, or may further comprise one or more additional components.

A user equipment (UE) may for instance correspond to a mobile device such as for example a mobile phone, tablet, smartwatch, a laptop, a Personal Digital Assistant (PDA) device, a wearable, an Internet-of-Things (IoT) device, an IIOT (Industrial IoT) device the vehicle and/or combinations thereof. Such a user equipment may also be referred to as user device.

A network node may correspond to a component of a communication network such as for instance a Base Transceiver Station (BTS), a nodeB, an evolved node B (eNB), a Next Generation NodeB (gNB), a distributed unit (DU), a central unit (CU) and/or combinations thereof. A network node may be referred to as node. A network node may correspond to a primary node (e.g., master node) and/or a secondary node, in addition to the master node.

The method may thus be performed and/or controlled by an apparatus, wherein the apparatus may in particular be a UE. When, with respect to the first example aspect, an apparatus is disclosed, this comprises in particular a UE. The method may be performed prior to establishing a communication session between a UE and a network node. The method may be part of a random access procedure, for instance to a network node. The method may be performed while an apparatus performing the method is camping on a cell. When camping on a cell, the apparatus may receive at least one radio signal from a network node providing the cell.

A network node may provide a cell. A cell may for instance correspond to a spatial coverage area in which a UE may be located while being able to receive and/or receiving radio signals from and/or being able to transmit and/or transmitting radio signals to the network node and/or while being able to maintain and/or maintaining a communication session with the network node.

In modern communication networks, network nodes may be capable of providing one or more so called beams, e.g. as part of a cell. In other words, a network node may be a beamforming network node. A beam may for instance be a (e.g., coherent, connected) area and/or a volume, in which a UE may be located in order to exchange signals with the network node providing the beam. A beam may be part of a cell. A beam may be a radio beam. A beam may be beamformed, for instance using an antenna array, for instance by (e.g., an antenna array of) a network node providing the beam. A beam may be separated from other beams of the same network node, e.g., in the frequency or time domain, so that interference between beams is minimized. A beam may take various shapes in space such as for instance an approximately elliptical or spherical volume, a cylindric volume or a cone-shaped volume. Beams may cover mutually different distances (e.g., from the network node) and/or different (spatial) angles.

A network node may provide a single beam. A network node may provide multiple beams. A network node may provide at least two, three, four, 5, 6, 7, 8, 9, 10 or more beams. The provided beams may differ from one another in, for instance, their size (e.g., volume and/or area), their direction (e.g., relative to the network node), their sending power, their reception sensitivity, a (e.g., their and/or the) frequency range and/or combinations thereof. A cell provided by a network node may for instance comprise a subset or all of the beams of the network node (for instance, the (e.g., all) beams currently provided by the network node). The network node may dynamically adapt at least one or more beams and/or (de-) activate at least one or more beams.

The method comprises to determine a serving beam. The serving beam may for instance be a beam-formed radio beam (e.g., as described above). The serving beam may be provided by a network node to which the apparatus performing the method will attempt a perform a random access. The serving beam may be receivable by the apparatus performing the method, for instance at least one signal and/or message may be receivable by the apparatus by means of the serving beam, e.g., from a network node providing the beam. For instance, the serving beam may be a synchronization signal block, SSB, beam. I.e., for instance, the apparatus performing the method may receive at least one synchronization signal block by means of the beam.

The serving beam is determined by the apparatus performing the method. For instance, the apparatus may determine the beam based on at least one measurement, for instance a measurement made by the apparatus. The measurement may for instance be related to a property of the beam, for instance a received property (e.g., received by the apparatus). The property may for instance correspond to a (e.g., received, e.g., from the network node) signal strength (e.g., of the beam and/or e.g., at a (e.g., current) location of the apparatus performing the method), a round trip time, a signal-to-noise ratio (SNR), a signal to interference plus noise ratio (SINR) and/or combinations thereof. For instance, the serving beam may be the (e.g., only) beam receivable by the apparatus. Additionally or alternatively, the apparatus may compare at least two or more beams by at least one property. The serving beam may be a beam with the most advantageous property, for instance, the strongest signal strength, shortest round trip time, highest SNR and/or highest SNIR. The serving beam may thus be a (e.g., the) preferred beam. The serving beam may thus be a (e.g., the) best receivable beam.

The serving beam may for instance be determined independently or dependently of a service. The service may for instance be a service to be requested by the apparatus performing the method from a (e.g., the) network node, to which the apparatus will perform a random access and/or from which it receives the serving beam.

The serving beam may be associated to a beam index. For instance, the beam index may be unique to the serving beam. For instance, a given beam (e.g., all beams) provided by a network node may have one (e.g., unique) beam index different from (e.g., any) other beams provided by the network node. A beam index may for instance be represented by a number, e.g., by an integer, a floating point number and/or combinations thereof. A beam index may for instance be represented by a letter. A beam index may for instance be represented by a binary number and/or may assume values between 1 and a power of 2. The beam indices of the beams of a given network node may for instance be sortable. I.e., any given beam index may be compared to other beams by its beam index. I.e., any two beam indices may be comparable. A comparison may for instance be performed by at least one comparing metric such as an arithmetic inequality operation, e.g. "larger"/> or "smaller"/<. For any two beams, the comparison may yield a reproducible result. The beams may be sortable by their beam indices in a reproducible manner, for instance by the apparatus performing the method and/or by the network node. E.g., both the UE performing a method according to the first example aspect and a (e.g., the) network node are enabled by the indices to sort the beams in the same order.

The method further comprises to obtain at least two sets of random access channel, RACH, configurations. For instance, the at least two sets of RACH configurations may be obtained from a network node, for instance from a (e.g., the) network node providing the serving beam. For instance, the at least two RACH configurations may be obtained via the serving beam. For instance, obtaining may comprise receiving the sets of RACH configurations as part of system information, for instance via the serving beam. System information may for instance comprise and/or correspond to a System Information Block (SIB), a Master Information Block (MIB) and/or combinations thereof. For instance, the at least two sets of RACH configurations may be obtained by a synchronization signal, e.g., a Synchronization Signal Block (SSB). An SSB may comprise Primary Synchronization Signal(s) (PSS), Secondary Synchronization Signals (SSS), and/or a Physical Broadcast Channel (PBCH). At least one of the at least two or (e.g., all of) the at least two sets of RACH configuration may be specific to a network node, in particular the network node providing the serving beam and/or transmitting the at least two sets of RACH configurations to the apparatus performing the method.

For instance, at least one set of the at least two RACH configurations may comprise (e.g., only) a single or multiple RACH configurations. A set of RACH configurations may for instance comprise 2, 3, 4, 5, 6, 7, 8, 9, 10, 11, 12, 13, 14, 15, 16, 20, 32, 40, 50, 60, 64 or more RACH configurations.

The at least two sets of RACH configurations may be mutually different. For instance, at least one, a subset or all of the RACH configurations of a given set of RACH configurations (e.g., provided by a network node) may be different from (e.g., all) RACH configurations comprised by other sets of RACH configurations (e.g., provided by the network node).

At least one of the at least two sets of RACH configurations may be a beam-specific set of RACH configurations. For instance at least one of one, a subset or all RACH configurations of a beam-specific set of RACH configurations are beam-specific. For instance, a beam-specific RACH configuration supports (e.g., only) one specific beam of the network node. Additionally or alternatively, beam-specific RACH configuration supports (e.g., only) a subset of beams of a network node, for instance the network node from which the at least two sets of RACH configurations, e.g., by system information, are received. The supported subset of beams may in particular be different from the entirety of beams. In other words, a beam-specific RACH configuration (and/or a beam-specific set of RACH configurations) does not support all beams of the network node. A beam-specific RACH configuration may be specific to one beam only or alternatively support multiple beams.

When a RACH configuration and/or a set of RACH configurations supports a beam, this may denote that the apparatus and/or a UE may (e.g., successfully) use the RACH configuration for random access to the beam supported by the supporting RACH configuration.

For instance, the apparatus performing the method according to the first example aspect (e.g., UE) may acquire a system information (e.g., SIB or MIB), e.g., from and/or via its serving beam. The system information may comprise the (at least 2) RACH configurations. A first set of RACH configuration may be a beam-independent (e.g., common/default) RACH configuration. A second set of RACH configurations may be beam-specific. A given RACH configuration (e.g., comprised by the beam-independent and/or beam-specific set of RACH configurations) may include information on a mapping of SSB (e.g., SSB index) and/or beam index to RACH occasions.

A single RACH configuration may support one, two or more beams. For instance, a beam-specific RACH configuration may (e.g., only) support a single beam or 2, 3, 4, 5, 6, 7, 8, 10, 16, 20, 32 or more beams. For instance, a beam-independent RACH configuration may support (e.g., only) 1, 2, 3, 4, 5, 6, 7, 8, 10, 16, 20, 32 or more beams.

The method may further comprise to select one of the at least two sets of (e.g., obtained) RACH configurations. Selecting may at least partially based on and/or be dependent on a beam, for instance on the serving beam and/or a (e.g., the) selected beam. For instance, selecting may be based on a (e.g., the) beam index of a beam, for instance of the serving and/or a selected beam.

The selected beam and/or the serving beam may be one of the beams provided by the network node, for instance. For example, the selected beam may be (e.g., only) characterized by having been and/or being selected by the apparatus performing the method according to the first example aspect.

According to an embodiment of the first example aspect, the selecting may for instance be independent of the serving beam. In this case, the apparatus may for instance (e.g., further) select a selected beam. In other words, the method according to the first aspect may further comprise the action of selecting a selected beam. The selected beam may be selected for a random access procedure. The serving beam may be different from the selected beam. For instance, the selected beam may be selected based on a (e.g., desired) service, for instance a service to be provided by the network node to the apparatus.

The selected set of RACH configurations may support the beam (e.g., selected beam or serving beam) based on which the selected set of RACH configurations is selected. The selected set of RACH configurations may for instance be beam-specific.

For instance, the apparatus performing the method according to the first aspect (e.g., UE), may determine which RACH configuration is applicable for random access to a (e.g., the network node) based on a beam index of a (e.g., the (e.g., best) serving and/or selected) beam, for instance based on an SSB beam index of the serving beam. For instance, the apparatus may fall back to a beam-independent (i.e., default) (set of) RACH configuration(s) in case the beam index (e.g., SSB beam index) of the beam is not part of any beam-specific (set of) RACH configuration(s). Alternatively or additionally, the apparatus may use a beam-specific RACH configuration in case the beam index (e.g., SSB beam index) of the beam is part of a specific RACH configuration.

The method further comprises to determine a RACH occasion. Determining a RACH occasion may at least partially be based on the selected set of RACH configurations, in particular one RACH configuration of the selected set of RACH configurations. Additionally or alternatively, the determining may be based on a beam, in particular at least one of the serving beam or the selected beam. In particular, determining a RACH occasion may be based on a RACH configuration of the selected set of RACH configurations, wherein the RACH configuration may support the (e.g., selected and/or serving) beam.

The RACH occasion may be determined by the apparatus performing the method based on information provided by the network node (i.e., cell). Such information may at least comprise a RACH configuration. A RACH configuration may encompass at least one or more parameters. The parameters may for instance define at least one of a RACH format (e.g., format of RA preamble and/or format of RA occasion) to be used, how the preambles are derived based on a root sequence, how the SSB beams are mapped to (e.g., different) RACH occasions, a transmission power for RACH (e.g., RA preamble transmission) and/or combinations thereof.

A RACH occasion may be limited to (e.g., accommodating) a maximum of 64 random access (RA) preambles. For instance, at least one of the RA preambles (e.g., a corresponding portion of the RACH occasion) can be reserved for a given purpose. E.g., such a purpose may correspond to at least one of contention-based access, contention free based access, early indication of a particular UE capability, beam failure recovery and/or combinations thereof.

For instance, the apparatus performing the method according to the first aspect (e.g., UE) may determine a RACH occasion at least partially based on one or more beam indices supported by the selected (set of) RACH configuration(s). For instance, the RACH occasion may be determined based at least partially on an order of beam indices within the selected (set of) RACH configuration(s).

For instance, it may be determined, for instance regarding the selected (set of) RACH configuration(s), which beam indices are supported. In case a beam-independent (i.e., common/default) (set of) RACH configuration(s) is selected, the supported beam may comprise (e.g, all) beam indices (e.g., of beams provided and/or providable by the network node) except indices of beams supported by at least one beam-specific (set of) RACH configuration(s). In case a beam-specific (set of) RACH configuration(s) is selected, supported beam indices may be the indices of beam supported by the beam-specific (set of) RACH configuration(s). The (set of) RACH configuration(s) may (e.g., explicitly) list the supported beams (e.g., their beam indices).

Determining a RACH occasion may for instance comprise creating an ordered list of the supported beam indices for the selected (set of) RACH configuration(s). Determining the RACH occasion may comprise selecting the RACH occasion which corresponds to a position of the (e.g., selected and/or (e.g., best) serving) beam (e.g., beam index (e.g., SSB beam index)) within the ordered list created. Determining a RACH occasion may further at least partially be based on assistance information, which may for instance have been obtained, for instance from the network node, for instance as System Information (e.g., SIB and/or MIB).

The method may further comprise to transmit a random access preamble using the determined RACH occasion. The transmission of the RA preamble may initiate a random access procedure between the apparatus performing the method and a network node. For instance, the RACH occasion may accommodate the RA preamble. The RA preamble may be transmitted to the network node from which the at least two RACH configurations were received. The RACH occasion may belong to a beam, for instance the beam based on which the (set of) RACH configuration(s) has been selected by the apparatus. The RA preamble may be transmitted to a network node, in particular the network node from which the at least two sets of RACH configurations have been obtained.

According to an embodiment of the first example aspect, the method further comprises at least one of

- select the selected beam or
- select the selected beam based on a type of services (e.g., initiated via the selected beam).

The method may further comprise to select the selected beam. For instance, the selected beam may be selected based on at least one property such as for instance, a measured property, for instance, a signal strength (e.g., a Received Signal Strength Indication, RSSI), Signal to Noise Ratio (SNR), Signal to Noise plus Interference Ratio (SNIR), round trip time (RTT) and/or combinations thereof.

The selected beam may be selected based on a type of service, for instance, based on a type of service initiated and/or to be initiated via the selected beam and/or a type of service to be provided by the network node to the apparatus performing the method according to the first example aspect.

According to an embodiment of the first example aspect, at least one of

- the selected beam is identical to the serving beam or
- the selected beam is different from the serving beam.

The serving beam may be identical to the selected beam. In this case, the method comprises selecting the set of RACH configurations and the RACH configuration based on the serving beam. The selected beam may also be different from the serving beam. In this case, the method comprises selecting the set of RACH configurations and the RACH configuration based another beam than previously determined. For instance, an apparatus performing the method may obtain the at least two sets of RACH configurations via the serving beam and subsequently perform a random access using another, selected beam. By this, the apparatus has added flexibility of choosing its desired (selected) beam. The serving beam may for instance be a best beam according to at least one criterion such as for instance signal strength. The selected beam may for instance be inferior to the serving beam according to at least one criterion, in particular the criterion, for instance signal strength. The selected beam may be suited for a requirement of the apparatus performing the method, for instance for a desired service.

According to an embodiment of the first example aspect,

- the random access preamble is transmitted on the serving beam;
- the random access preamble is transmitted on the selected beam;
- the random access preamble is transmitted on the selected beam, wherein the selected beam is different from the serving beam or
- the random access preamble is transmitted on the selected beam, wherein the selected beam is different from the serving beam, wherein the selected beam is selected by the apparatus (e.g., based on measurements, service and/or combinations thereof).

The RA preamble may be transmitted on a given beam. In other words, the RACH occasion in which the RA preamble is submitted may belong to the respective given beam. The beam in which the RA preamble is transmitted may for instance be the serving beam. For instance, the beam via which the apparatus obtained the at least two sets of RACH configurations may be identical to the beam in which the RA preamble is transmitted. For instance, the RA preamble may be transmitted in a selected beam that is different from the serving beam. The selected beam may for instance be selected by the apparatus, for instance based on at least one of measurements (e.g., taken by the apparatus), a service (e.g., service type, e.g., desired by the apparatus and/or to be provided by the network node to the apparatus) and/or combinations thereof. In case the RA preamble is transmitted on a (selected) beam different from the serving beam, the selected set of RACH configurations may be determined based on this (e.g., selected) beam rather than on the serving beam.

According to an embodiment of the first example aspect, at least one of the at least two sets of RACH configurations is a beam-independent set of RACH configurations (i.e., common/default RACH configurations), wherein one or more RACH configurations of the beam-independent set of RACH configurations are beam-independent, wherein the beam-independent set of RACH configurations support at least one of

- all or a majority of (e.g., currently provided, (theoretically) providable) beams of a network node, or
- all beams of a (e.g., the) network node not supported by any beam-specific RACH configuration.

The (e.g., all of the) at least two sets of RACH configurations may be beam-specific.

Alternatively, at least one of the at least two sets of RACH configurations may be a beam-independent set of RACH configuration. The attribute beam-independent may also be termed default or common. The at least two sets of RACH configurations may for instance comprise (e.g., only) one beam-independent set of RACH configurations and at least one or more beam-specific sets of RACH configurations.

For instance, RACH configurations of the beam-independent sets of RACH configurations may comprise (e.g., only) beam-independent RACH configurations. A beam-independent set of RACH configurations may contain (e.g., only) one single beam-independent RACH configuration.

A beam-independent RACH configuration and/or a beam-independent set of RACH configurations of may for instance support all beams of a network node. Additionally or alternatively, a beam-independent RACH configuration may support a majority of beams of a network nodes. A majority may correspond to at least 50%, 60%, 70%, 80%, 90%, 95% and/or all but 1, 2, 3, or 4 beams of the network node.

For instance, a beam-independent RACH configuration and/or a beam-independent set of RACH configurations may support (e.g., all) beams of a (e.g., the) network node, in particular or (e.g., only) those beams which are not supported by any beam-specific (set of) RACH configurations. In other words, some beams of the network node may be supported by a beam-specific RACH configuration (e.g., comprised by a beam-specific set of RACH configurations). Some beams of the network node may not be supported by any beam-specific RACH configurations. Those latter beams are then supported by a (e.g., the; e.g., at least one) beam-independent RACH configuration. For instance, the apparatus may, for a given beam, (e.g., only) use the beam-independent RACH configuration if no beam-specific RACH configuration for that beam has been obtained.

According to an embodiment of the first example aspect, at least one of the at least two sets of the RACH configurations comprises a respective indication of one or more beams supported by the respective RACH configuration.

For instance, (e.g., only) one RACH configuration of (e.g., only) one set of RACH configuration may comprise an indication of one or more supported beams. Additionally or alternatively, the (e.g., all of the) RACH configurations of a given (e.g., a beam-specific) set of RACH configurations may comprise a respective indication of one or more supported beams. A beam-independent set of RACH configurations may be free of an indication of one or more supported beams.

According to an embodiment of the first example aspect, the selection of the selected set of RACH configurations is at least partially based on a beam index (e.g., SSB index) of the serving beam.

For instance, a (e.g., the; e.g., all) RACH configurations and/or sets of RACH configurations may comprise an indication of at least one beams which the (set of) RACH configurations support. Such an indication may comprise at least one beam index of the at least one supported beam. When selecting a selected set of RACH configurations based on a (e.g., serving and/or selected) beam, the apparatus may search for a set of RACH configurations that indicates support of the beam index of the respective beam. The beam index may here, in the following and foregoing for instance be an SSB index which may for instance have been received be the apparatus from the network node as part of a synchronization signal.

According to an embodiment of the first example aspect, the selected set of RACH configurations comprises a RACH configuration which supports the serving beam or the selected set of RACH configurations is a beam-specific set of RACH configurations.

One purpose of selecting a set of RACH configurations may be to enable the apparatus to transmit a RA preamble in a suitable RA occasion. Typically, the RA occasion belongs to a beam. In other words, the apparatus may select a beam to transmit the RA preamble on (e.g., based on measurements and/or a service). Subsequently, a suitable set of RACH configurations for (i.e., supporting) this selected beam (e.g., serving beam or different beam) may be selected.

The selected set of RACH configurations may for instance be a beam-specific set of RACH configurations. In particular, if the selected (e.g., serving) beam is supported by a beam-specific (set of) RACH configuration(s), the selected set of RACH configurations may be beam-specific.

According to an embodiment of the first example aspect, the determination of the RACH occasion is based on an ordered list of beams (e.g., by beam index or a list of beam indices) (e.g., indicated by the respective indication) supported by at least one of the selected set of RACH configurations, or the (e.g., all) obtained at least two sets of RACH configurations, and wherein the RACH occasion is determined based on the ordered list (e.g., filling the available RACH resource with RACH occasions of the respective beams according to the ordered list along a given allocation order of RACH-occasion resources).

A RACH occasion may for instance be a given radio resource defined in time and frequency. For instance, multiple RACH occasions are arranged in immediate (e.g., including a guarding distance from a previous and/or following RACH occasion in time and/or frequency) succession. It has been recognized that explicitly defining, for every RACH occasion (e.g., of every beam provided and/or providable by a, in particular the, network node) such a resource in time and frequency may cause avoidable signaling volume (e.g., when indicating the sets of RACH configurations to a UE (e.g., the apparatus)). Instead, the available radio resource for (e.g., all) RACH occasions may be populated with RACH occasions of different beams in a certain order. When deriving a RACH occasion for a given beam, one may iterate through beams in the certain order, cumulating their respective RACH occasion sizes (e.g., virtually, e.g., in the available radio resource) and thereby arrive at the RACH occasion of the given beam. It has thus been recognized that an ordered list of beams is a helpful tool for an efficient RACH occasion determination.

An ordered list of beams may for instance be ordered according to any (e.g., defined) order. The order may be reproducible. In other words, the ordered list of beams is not random. The order may be defined by the apparatus and/or by the network node. The order may be predefined (e.g., for both the apparatus and the network node) or may be signaled (e.g., using an information element indicating a given order; e.g., from the network node to the UE, e.g., as part of assistance information). By ordering, for instance, both the apparatus and the network node may deduce the same list (i.e., a list in the same order) of beams, without needing to explicitly transmit the order. An ordered list of beams may for instance be based on beam indices of the respective beams. For instance, an index obtained as an SSB index (e.g., by the apparatus) may serve as a beam index.

The ordered list of beams may comprise (e.g., all) beams supported (e.g., only) by the selected set of RACH configurations. Additionally or alternatively, the ordered list of beams may comprise (e.g., all) beams supported by the (e.g., all) obtained at least two sets of RACH configurations. Additionally or alternatively, the ordered list of beams may comprise all beams (e.g., theoretically) providable and/or currently provided.

The RACH occasion may be determined based on the ordered list. As alluded to above, a RACH resource accommodating (e.g., all) RACH occasions of different beams may be (e.g., at least virtually) filled with RACH occasions (e.g., of individual sizes in frequency and/or time) in the order of the ordered list of beams, e.g., in order to derive the RACH occasion of the (e.g., serving and/or selected) beam to transmit the RA preamble on. The apparatus may for instance order the beams. E.g., the apparatus may create the ordered list, for instance in total (e.g., comprising (e.g., all) beams of supported by the selected and/or comprising (e.g., all) beams supported by (e.g., all of) the obtained sets of RACH configurations). Alternatively, the apparatus may create a list (e.g., only) comprising beams which, according to the order according to which the ordered list is ordered, precede the (e.g., selected and/or serving) beam to which the apparatus intends to transmit a RA preamble. For instance, the apparatus may filter out (e.g., discard) beams (e.g., without ordering them) prior to creating the ordered list of beams. For instance, such filtering may discard (e.g., disregard) beams which at least one of succeed the beam to transmit the RA preamble on, are supported or unsupported by certain (e.g., beam-specific and/or beam-independent) sets of RACH configurations, correspond to inactive beams and/or combinations thereof.

For instance once an ordered list has been created, the method may comprise, e.g., subsequently, to iterate through the beams along the ordered list, e.g., until the beam to transmit the RA preamble on is reached. For instance, the respective RACH occasions of beams are cumulated while iterating through the list and thus, the RACH occasion of the beam of interest (e.g., selected or serving) may be determined.

According to an embodiment of the first example aspect, a respective ordered (e.g., partial) list is ordered at least one of

- in ascending order of beam indices of the (e.g., providable and/or (currently) provided) beams (e.g., of the network node) or
- in descending order of beam indices of the beams,
- dependently on at least one set of RACH-configurations (e.g., whether the respective beams are supported by a (i.e., at least one) beam-specific RACH-configuration (or not)), or
- independently of (e.g., sets of) RACH configurations.

The ordered list may be ordered according to a predefined order. For instance, the order may be based on beam indices. For instance, the beam indices may be ordered in ascending and/or descending order (e.g., of their respective values).

The order of the ordered list may be dependent on (e.g., based on) at least one set of RACH configurations. For instance, (e.g., only) beams of a certain type of (set of) RACH-configurations (e.g., beam-independent and/or beam-specific) may be ordered and/or beams may be ordered by (e.g., within) type of (e.g., set of) RACH configurations. For instance, the order may comprise a hierarchy by which for instance, beams are sorted by (e.g., type of) (e.g., set of) RACH configuration in a first step and subsequently ordered by beam index.

The order of the ordered list may for instance be independent of (e.g., sets of) RACH configurations. For instance, the order may be (e.g., only) based on beam indices without considering (e.g., independently of) the (e.g., sets of) RACH configurations the beams are supported by.

According to an embodiment of the first example aspect, the ordered list is ordered at least one of

- in ascending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations or
- in descending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations,
- dependently on at least one at least one of the selected set of RACH configurations, at least one of the obtained at least two sets of RACH configurations, at least one of the beam-specific sets of RACH configurations or at least one beam-independent sets of RACH configurations, or
- independently of at least one or any of the selected set of RACH configurations, the obtained at least two sets of RACH configurations, the beam-specific sets of RACH configurations or the beam-independent sets of RACH configurations.

The ordered list may be ordered in ascending order of beam indices of the beams supported by at least one RACH configuration of the selected set of RACH configurations. Additionally or alternatively, the ordered list may be ordered in ascending order of beam indices of the beams supported by at least one RACH configuration of at least one of the obtained at least two sets of RACH configurations. Additionally or alternatively, the ordered list may be ordered in ascending order of beam indices of the beams supported by at least one RACH configuration of at least one of the beam-specific sets of RACH configurations. Additionally or alternatively, the ordered list may be ordered in ascending order of beam indices of the beams supported by at least one RACH configuration of at least one of the beam-independent sets of RACH configurations.

The ordered list may be ordered in descending order of beam indices of the beams supported by at least one RACH configuration of the selected set of RACH configurations. Additionally or alternatively, the ordered list may be ordered in descending order of beam indices of the beams supported by at least one RACH configuration of at least one of the obtained at least two sets of RACH configurations, Additionally or alternatively, the ordered list may be ordered in descending order of beam indices of the beams supported by at least one RACH configuration of at least one of the beam-specific sets of RACH configurations. Additionally or alternatively, the ordered list may be ordered in descending order of beam indices of the beams supported by at least one RACH configuration of at least one of the beam-independent sets of RACH configurations, The ordered list may be ordered dependently on at least one or all of the selected set of RACH configurations. Additionally or alternatively, the ordered list may be ordered dependently on at least one of or the obtained at least two sets of RACH configurations. Additionally or alternatively, the ordered list may be ordered dependently on at least one of or all of the beam-specific sets of RACH configurations. Additionally or alternatively, the ordered list may be ordered dependently on at least one or all of the beam-independent sets of RACH configurations. By ordering dependently on (sets of) RACH configurations, the ordering may for instance facilitate support for legacy apparatuses which may for instance not support beam-based random access and/or may not support any special ordering methods.

The ordered list may be ordered independently of at least one or any of the selected set of RACH configurations. Additionally or alternatively, the ordered list may be ordered independently of at least one or any of the obtained at least two sets of RACH configurations. Additionally or alternatively, the ordered list may be ordered independently of at least one or any of the beam-specific sets of RACH configurations. Additionally or alternatively, the ordered list may be ordered independently of at least one or any of the beam-independent sets of RACH configurations. By ordering independently of the sets of RACH configurations, the order may be established particularly easily and efficiently. For instance, no knowledge about (sets of) RACH configurations is required and may be done offline and/or the order may even be preconfigured and/or fixed.

According to an embodiment of the first example aspect the ordered list corresponds to a concatenation of a first partial ordered list of beams unsupported (e.g., free of support, not supported) by any (and/or a) beam-specific RACH configuration of at least one of or any of the selected set of RACH configurations or at least one of or any of the obtained at least two sets of RACH configurations (i.e., beams only supported by a (e.g., the) default RACH configuration) and a second partial ordered list of beams supported by at least one (e.g., or one) beam-specific RACH configuration of at least one of the selected set of RACH configurations or at least one of the obtained at least two sets of RACH configurations.

For instance, the order of beams may be chosen to group (e.g., all) RACH occasions of beams without (e.g., support by) a beam-specific (e.g., set of) RACH configuration(s) in a first part of a RACH resource. Beams supported by (e.g., at least one) beam-specific (e.g., set of) RACH configuration(s) may be grouped in a second part of the RACH resource. The second part of the RACH resource may succeed the first part of the RACH resource, e.g., in time and/or frequency).

The ordered list may thus correspond to a concatenation of a first partial ordered list and a second partial ordered list. The first partial ordered list may comprise beams unsupported by a (e.g., any) beam-specific RACH configuration of the sets of RACH configurations. If a beam is unsupported this may here denote that the beam is e.g., free of support and/or not supported by a (e.g., any) beam-specific (e.g., set of) RACH-configuration(s). The unsupported beam may in particular (e.g., only) be supported by a (e.g., the) beam-independent (i.e., common/default) RACH configuration. The second partial ordered list of beams may comprise beams supported by a (e.g., at least one or (e.g., only) one) beam-specific RACH configuration of the sets of RACH configurations.

The ordered list may comprise the first partial list first and the second ordered list second. This order will be reflected in the RACH occasion order across beams within the RACH resource. This order may in some cases have the effect that apparatuses which do not support beam-based (e.g., random) access may easily access the beam-independent RACH occasion.

According to an embodiment of the first example aspect, at least one of

- the RACH occasion is determined at least partially based on assistance information, or
- the RACH occasion is determined at least partially based on assistance information, wherein the assistance information at least one of
  - is obtained as system information (e.g., the system information),
  - is comprised by at least one RACH configuration, or
  - indicates a mapping (e.g., mapping function) between beams (e.g., by beam indices) and RACH occasion (e.g., occasion size in the time-frequency-domain).

Assistance information may enable and/or assist (e.g., the apparatus) in determining at least one RACH occasion. For instance, assistance information may indicate RACH occasion sizes (e.g., in frequency and/or time), at least one indication of an order to use (e.g., ascending, descending, dependent of RACH configurations and/or independent of RACH configurations), a (e.g., fixed) offset, at least one formula relating a RACH occasion offset (e.g., from a radio frame) and/or combinations thereof.

The assistance information may for instance be obtained as system information (e.g., SIB or MIB), by RRC signaling, and/or by at least one synchronization signal (e.g., at least one part of an SSB). Assistance information may be obtained by a beam, e.g., the serving beam or by another beam different from the serving beam.

Assistance information may be comprised by at least one (e.g., set of) RACH configuration(s) and/or separately from (e.g., any) RACH configuration. For instance in a signaling separate from a signaling transporting RACH configurations or in the same signaling transporting (e.g., the) (sets of) RACH configuration(s).

Assistance information may for instance indicate a mapping between beams and RACH occasions. For instance, the mapping may take form of a mapping function, for instance relating at least one beam index or beam indices to at least one RACH occasion size and/or location in time and/or frequency (e.g., within the RACH resource).

According to a second example aspect, a method is disclosed, comprising:

- determine at least one beam-specific (e.g., optimal under given criteria and/or UE-specific) RACH configuration for at least one beam of (e.g., providable/provided by) the apparatus (e.g., network node),
- determine a beam-specific set of random access channel, RACH, configurations comprising the at least one determined beam-specific RACH configuration,
- transmit (e.g., as part of system information) at least two (e.g., mutually different) sets of RACH configurations (e.g., specific to the network node) to at least one user equipment, UE, wherein the at least two sets of RACH configurations comprise the determined beam-specific set of RACH configurations.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a network node in a communication system and/or by a user equipment (UE). For instance, the method may be performed and/or controlled by using at least one processor of the electronic device.

According to a further example aspect, a computer program is disclosed, the computer program when executed by a processor causing an apparatus, for instance a server, a network node or a UE, to perform and/or control the actions of the method according to the second example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-(e.g., only) Memory (ROM) or hard disk of a computer, or be intended for distribution of the program, like an optical disc.

According to a further example aspect, an apparatus is disclosed, configured to perform and/or control or comprising respective means for performing and/or controlling the method according to the second example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise (e.g., only) the disclosed components, for instance means, processor, memory, or may further comprise one or more additional components.

The method may thus be performed and/or controlled by an apparatus, wherein the apparatus may in particular be a network node. When disclosure regarding the second example aspect relates to an apparatus, this inter alia discloses a network node. The apparatus performing the method according to the second example aspect may interact with an apparatus performing a method according to the first example aspect, in particular in the course of a random access procedure.

The method comprises to determine at least one beam-specific RACH configuration. The beam-specific RACH-configuration may be determined for at least one beam of the apparatus. For instance, the apparatus may, as a network node, provide (e.g., the) at least one beam and/or be capable of providing (e.g., the) at least one beam. The determined RACH configuration may be adapted to the beam. For instance, at least one property of a RACH occasion derivable from the determined RACH configuration may be adapted to the respective beam. For instance, such a property may be a size (e.g., in frequency and/or time) of the RACH occasion, a preamble length, a guard time (e.g., between preambles) or a combination thereof. The determined RACH configuration may be optimal according to at least one criterion, for instance, a RA collision probability below a predetermined probability threshold.

For instance, the apparatus performing the method according to the second example aspect (e.g., a network node) or another network entity may have information about at least one of RACH success rate (e.g., per beam), RACH load (e.g., per beam), type of services initiated (e.g., via at least one or (e.g., all) the beams) or a timing advance value (e.g., per beam). At least one of such information may be gathered by the apparatus performing the method according to the second example aspect, for instance by analyzing historical data and/or measurements and/or by receiving the respective information from another entity, e.g., another network node and/or a UE. At least a part of the information may be used for determining at least one (e.g., beam-specific) RACH configuration.

The method according to the second aspect may further comprise determining a beam-independent RACH configuration. The determined beam-independent RACH configuration may be determined at least partially based on a (e.g., previously determined) beam-specific RACH configuration. The determined beam-independent RACH configuration may be determined at least partially based on at least one property of a beam provided by the apparatus performing the method according to the second example aspect, for instance a (e.g., the) beam covering a large (e.g., the largest) coverage area and/or coverage volume among (e.g., all) the beams provided by the apparatus.

The network node may determine an (e.g., optimal) RACH configuration for at least one, multiple or all of the beams (e.g., provided by the apparatus) while accounting for at least one of a RACH load, a RACH success rate, a user location, a type of service(s) initiated via a given beam, beam size, or beam shape.

For instance, for a known (e.g., fixed) number of wireless access users at a cell edge, a particularly robust RACH (e.g., RACH occasion and/or RA preamble) may be advantageous. For instance, such knowledge may have been derived based on a RACH success rate. The method according to the second aspect may comprise to configure a RACH format (e.g., for a beam providing coverage at the cell edge) which allows for longer preambles and/or a guard time (e.g., to accommodate for larger propagation delays), for instance with fewer preambles.

The method further comprises to determine a beam-specific set of RACH configurations. The beam-specific set of RACH configurations may at least comprise the at least one determined beam-specific RACH configuration. The beam-specific set of RACH configurations may further comprise at least one or more additional (e.g., beam-specific) RACH configurations.

The method further comprises to transmit at least two sets of RACH configurations. The sets of RACH configurations may be mutually different. The at least two sets of RACH configurations comprise at least the determined beam-specific set of RACH configurations. The at least two sets of RACH configuration may further comprise a further beam-specific set of RACH-configurations and/or a (e.g., at least one or more) beam-independent set of RACH configurations.

For instance, the apparatus performing the method according to the second example aspect (e.g., a network node) may transmit a System information (e.g., SIB and/or MIB) or a synchronization signal (e.g., SSB) with a set (of at least 2) RACH configurations. A first of the at least two RACH configurations could be a beam-independent (i.e., common/default) configuration and a second set of RACH configurations could be a beam-specific configuration. At least one of or the respective RACH configurations may include information on mapping of beams (e.g., by index, for instance SSB index) to RACH occasions (e.g., properties of RACH occasions, e.g., location and/or size in frequency and time, preamble length, guard time and/or combinations thereof).

The at least two sets of RACH configurations are for instance transmitted to a UE, e.g., a UE performing the method according to the first example aspect. The transmission may for instance be carried out as a broadcast transmission, e.g., a one-way communication without an acknowledgement of reception. The at least two sets of RACH configurations may thus be transferred to none, one, or two or more UEs (e.g., at approximately the same time) in a single transmission. The at least two sets of RACH configurations may be transmitted as part of system information (e.g., SIB and/or MIB) and/or synchronization signals (e.g., SSB). The at least two sets of RACH configurations may be transmitted in one or more beams, for instance in (e.g., a subset or all of) the beams of (e.g., provided by) the apparatus performing the method according to the second example aspect.

According to an embodiment of the second example aspect, the method further comprises at least one of:

- transmit (e.g., previously determined or obtained) assistance information to the UE (e.g., as part of the same system information as the RACH configurations) or
- transmit assistance information to the UE, wherein the assistance information
  - is transmitted as system information,
  - is comprised by at least one RACH configuration, or
  - indicates a mapping between beams and RACH occasion.

Assistance information may for instance be transmitted by a synchronization signal (e.g., SSB) and/or system information (e.g., SIB and/or MIB) and/or RRC signaling. For instance, the at least two sets of RACH configurations may be transmitted together with the assistance information. For instance, assistance information is transmitted less frequently than sets of RACH configurations or alternatively at (at least approximately) the same rate.

According to an embodiment of the second example aspect, the method further comprises receive a random access preamble on a RACH occasion selected (e.g., selectable, i.e., occasion is compatible with and/or derivable based on the RACH configuration; the RA preamble may have at least one property different from a beam-independent RACH occasion) at least partially based on (e.g., at least one of) the at least one beam-specific RACH configuration.

The apparatus performing a method according to the second example aspect may receive an RA preamble (e.g., from an apparatus performing a method according to the first example aspect). The received RA preamble may be received via a certain beam, e.g., one of multiple beams provided by the apparatus. The apparatus may have previously provided assistance information and/or at least two sets of RACH configurations via the beam via which the RA preamble is received. The RA preamble may be received from a UE to which the apparatus previously transmitted the at least two sets of RACH configurations.

The received RA preamble may be received via a RACH occasion selected and/or derived based on a RACH configuration comprised by the (e.g., previously) transmitted at least two RACH configurations. For instance, the RA preamble may be transmitted (e.g., correctly, i.e., decodably) in a beam-specific RACH occasion (i.e., a RACH occasion derived using a beam-specific RACH configuration).

According to an embodiment of the second example aspect, at least one beam-specific RACH configuration is determined at least partially based on at least one of:
- a RACH load,
- a RACH success rate,
- a UE location (e.g., of the UE),
- a (e.g., spatial, estimated and/or probability) distribution of UEs (e.g., within a cell, in particular the cell provided by the network node; e.g., in relation to beams provided by the network node),
- a type of services (e.g., initiated via the respective beam),
- beam size, or
- beam shape.

A RACH load may for instance indicate at what frequency (e.g., occurrences per time) UEs attempt a random access using a given beam and/or RACH occasion. For instance, it may be detected that a certain beam receives more RA attempts than another beam. The method may comprise enlarging the RACH occasions of the beam with an elevated number of RA preamble receptions per time.

A RACH success rate may indicate what ratio of attempted random accesses (e.g., by UEs) in relation to the total number of attempted random accesses. For instance, a low RACH success rate may indicate a high number of RACH collisions in which individual RA preamble transmissions of two or more UEs collide and become indecodable for the apparatus performing the method according to the second example aspect.

A UE location may for instance be a spatial location of at least one UE or a group of UEs. For instance, if a large number of UEs is located at a given location, a beam providing radio coverage of that area may be configured (by RACH configuration) to obtain a large RACH occasion.

Similarly, a distribution of UEs (e.g., in space and/or time) may at least partially determine the RACH configuration. For instance, it may be recognized that e.g., in a certain area and/or at a given time, an increased and/or lowered demand for random access may be present. The method may comprise evaluating historical data (e.g., on RA procedures and/or user behavior and/or UE presences) in order to construct distributions of UEs or may use instantaneous measurements to construct such distributions. A distribution of UEs may be equivalent to a distribution of (e.g., attempted) random accesses.

Properties of the beam may further be used to determine a RACH configuration, for instance a size (e.g., area and/or volume) of a beam, a beam shape (e.g., narrow or wide, directed or approximately anisotropic), a beam angle (e.g., spatial angle, direction of major axis of extension and/or combinations thereof).

According to an embodiment of the second example aspect, the at least one beam-specific RACH configuration indicates at least one of:
- a RACH format,
- a (e.g., above average) random access preamble length,
- a guard time (e.g., between RA preambles, e.g. to accommodate for larger propagation delays),
- a number of preambles (e.g., within a given time-span/-slot, may differ from 64).
- a RACH occasion periodicity,
- a RACH frequency resource allocation,
- a RACH time resource allocation,
- a RACH power control information, or
- a RACH procedure failure timer (e.g., when the RACH procedure fails and the UE indicates this failure to the higher layers, the failure timer may indicate how long (e.g., the network node and/or the UE) should wait before a new RACH procedure is initiated and/or accepted).

According to an embodiment of the second example aspect, at least one of the at least two sets of RACH configurations is a beam-independent set of RACH configurations (i.e., common/default RACH configurations), wherein one of more RACH configurations of the beam-independent set of RACH configurations are beam-independent, wherein the beam-independent set of RACH configurations supports at least one of
- all or a majority of (e.g., currently provided, (theoretically) providable) beams of a network node, or
- all beams of a (e.g., the) network node not supported by any beam-specific RACH configuration.

According to an embodiment of the second example aspect, at least one of (or (e.g., all of)) the at least two sets of the RACH configurations comprises a respective indication of one or more (e.g., SSB) beams supported by the respective RACH configuration.

As a third example aspect, a system is disclosed comprising at least one UE performing and/or controlling a method according to the first example aspect and at least one network node performing and/or controlling a method according to the second example aspect.

For instance, the system comprising a user equipment, UE, and a network node, wherein the UE is configured to at least to (perform): (e.g., while camping on a cell; for at least partially performing a random access procedure to a network node, in particular the second apparatus):

determine a serving beam (i.e., beam-formed radio beam) (e.g., wherein the serving beam is associated to a beam index) (e.g., wherein the serving beam is a synchronization signal block, SSB, beam) (e.g., based on measurements, in particular measurements made by the first apparatus), obtain (e.g., receiving at least one of as part of system information or from a network node, in particular the second apparatus) at least two (mutually different) sets of random access channel, RACH, configurations (e.g., specific to the network node), wherein at least one of the at least two sets of RACH configurations is a beam-specific set of RACH configurations, wherein (i.e., all) RACH configurations of the beam-specific set of RACH configurations are beam-specific, wherein the beam-specific RACH configurations support (e.g., only) a subset (i.e., a subset different from the entirety of beams, i.e. not all beams) (e.g., singular or plural of beams; configurations may be specific to one beam only) of beams of a (e.g., the one from which sets of RACH configurations/system information is received) network node (e.g., the second apparatus), select one of the at least two sets of RACH configurations at least partially based on the serving beam (e.g., on a beam index of the determined beam), determine a RACH occasion at least partially based on at least one of the selected set of RACH configurations or the serving beam (i.e., based on configuration alone, serving beam alone or based on both (typical case)), and transmit a random access preamble using the (e.g., in the) determined RACH occasion (e.g., to the second apparatus), and the network node is configured to at least to (perform):

determine at least one beam-specific (e.g., optimal under given criteria and/or UE-specific) RACH configuration for at least one beam of (e.g., providable/provided by) the second apparatus (e.g., network node), determine a beam-specific set of RACH configurations comprising the at least one determined beam-specific RACH configuration, transmit (e.g., as part of system information) at least two (e.g., mutually different) sets of RACH configurations (e.g., specific to the network node) to at least one user equipment (in particular the first apparatus), UE, wherein the at least two sets of RACH configurations comprise at least one of the determined at least one beam-specific set of RACH configurations.

Disclosure presented with respect to the first, second, or third example aspect is disclosed for all respective other aspects as well, where applicable.

BRIEF DESCRIPTION OF THE DRAWINGS

In the figures show:

FIG. 1 demonstrates three example beams which may for instance be provided by a network node, for instance a network node performing a method according to the second example aspect. The three beams may for instance be (e.g., all) the beams provided by the network node to form a cell. A respective beam may have an index associated to it. In the shown embodiment, the beams are indexed by their synchronization signal block indices (SSB index), SSB #1,SSB #2,and SSB #3.

Figure 1:
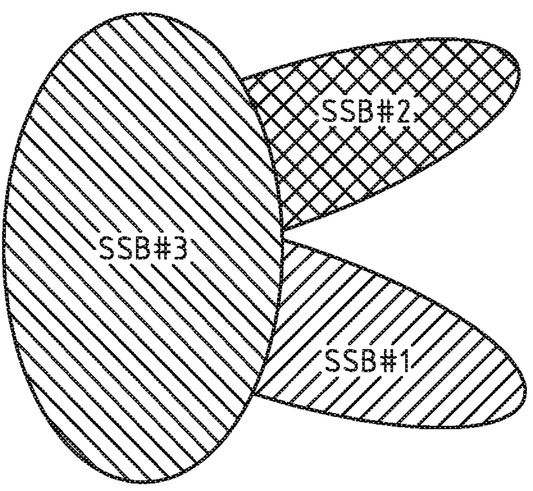
FIG. 1 an example embodiment beams provided by a network node according to all example aspects.

As can be seen, the left beam with index 3 (SSB #3) covers a larger area compared to the other two beams with indices 1 and 2. For instance, a network node providing the beams may be located within and/or close to the area covered by beam 3. Beam 3 may for instance be cover a vicinity of the network node. Beam 1 and 2 may be targeted towards comparably (to beam 3) smaller and/or narrow areas which may in particular be (at least partially) distanced further from the network node. It may for instance to be expected that a larger number of UEs is provisioned with network coverage by beam 3 compared to beams 1 and 2 (separately and/or jointly).

UEs may attempt a random access through any of the three beams, for instance depending on where the UE is positioned. It has been recognized that often, many UEs are provisioned with coverage by a large, central beam such as beam 3 in FIG. 1 which comparable fewer UEs are located within the coverage areas of beams 1 and 2. When many beams attempt an access using the same beam, the corresponding RACH resource (e.g., one or more RACH occasion accommodated by the RACH resource) may be attempted to be used by more than one UE at the same time which may result in collisions. Additionally, a RA procedure from different distances (e.g., close to the network node compared to at the cell edge) may impose different challenges on the transmission of RA preambles. For instance, farther distances between UE and network node may cause larger (e.g., group) delays and thus may cause overlap between RA preambles transmitted in successive RACH occasions. Additionally, due to larger distances, a strong attenuation of radio signals may occur, requiring a network node to receive signals (e.g., via beam 1 and/or 2) at an increased sensitivity, causing so called ghost RACH detection. Allocating many RACH occasions to a beam susceptible to ghost RACH detection (e.g., beam 1 or 2 in FIG. 1) may cause excessive ghost RACH detections and thus a waste of resources at the network node.

Figure 2A:
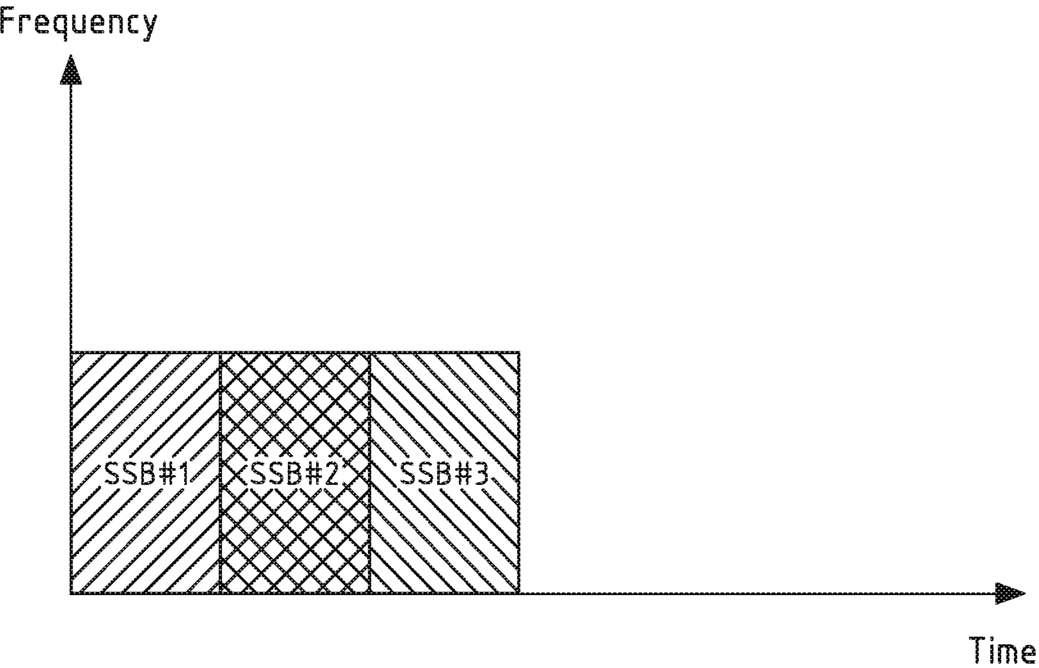
FIG. 2a-c example embodiments of RACH occasions according all example aspects.
Figure 2B:
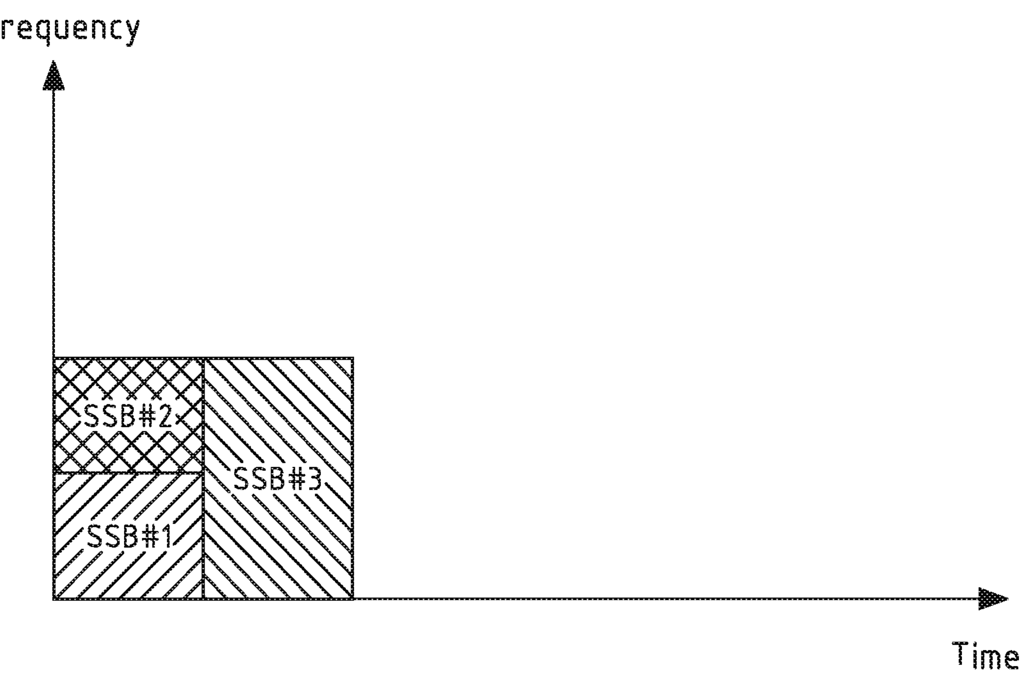
Figure 2C:
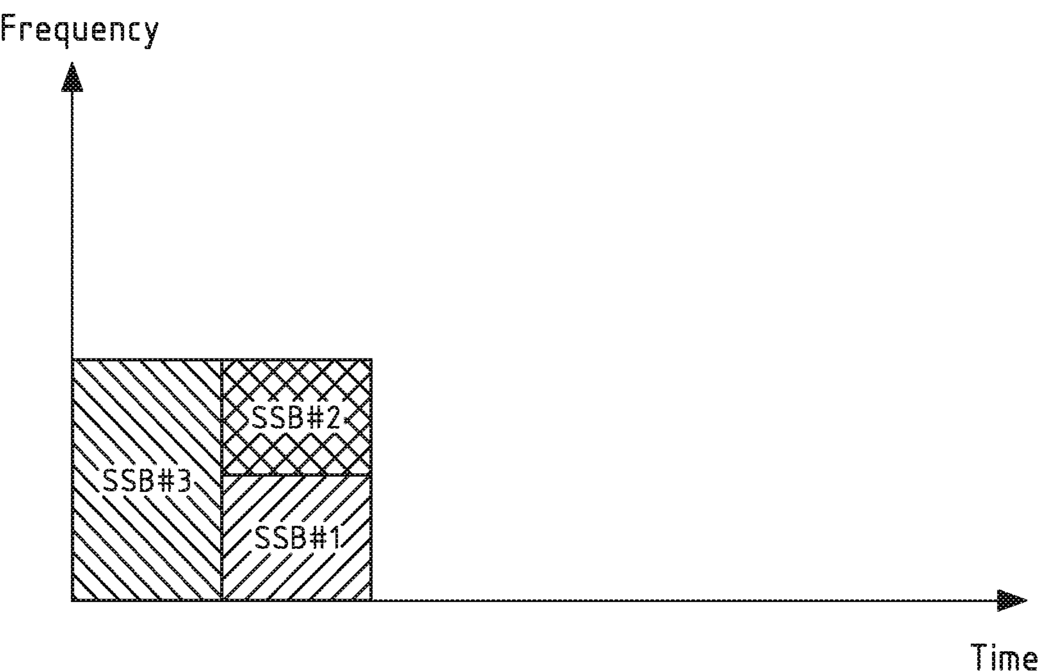

FIGS. 2a-c illustrate different ways of organizing RACH occasions, for instance for the beams shown in FIG. 1, in frequency and time (e.g., in a RACH resource defined in frequency and time).

FIG. 2*a* shows an embodiment in which RACH occasions are equally sized for all three beams of FIG. 1. For instance, an identical RACH configuration may be used for all three beams in this case, including but not limited to the RACH occasion size, time and frequency, guard time, preamble length and/or combinations thereof. A UE may for instance use a beam index of a given beam (e.g., a beam selected for RA) and select the appropriate time slot for the RACH occasion.

According to a different embodiment illustrated in FIG. 2*b*, RACH occasions may be sized differently for the three beams. A comparably larger RACH occasion has been allocated to beam 3 which covers a larger coverage area compared to beams 1 and 2. By this, for instance, RACH collisions on the large third beam may be decreased and ghost RACH detection on beams 1 and 2 may be decreased as well. Additionally to the RACH occasion size, other properties such as RA preamble length and/or guard time may differ between beam 1, 2 on the one hand and beam 3 on the other hand. Beams 1 and 2 may be supported by a beam-specific RACH configuration, for instance by a respective individual RACH configuration or by a single mutual RACH configuration supporting both. Beam 3 may be supported by another beam-specific RACH configuration or alternatively by a beam-independent RACH configuration. As can be seen, the RACH occasions are ordered by beam indices in frequency and time, wherein the RACH resource (e.g., cumulated area of all three RACH occasions) is filled in the frequency-axis first and subsequently in the time-axis. In other words, the available frequency interval is fully used for RACH occasions first and subsequently, the next slot in time is filled. The RACH occasions are densely arranged in frequency and time without an unused portion of the resource between any two RACH occasions. In the embodiment shown in FIG. 2*b*, the RACH occasions are ordered in frequency and time (e.g., only) according to their beam indices, in particular independently of RACH configurations.

FIG. 2*c* illustrates an ordering which is at least partially dependent on RACH configurations. The third beam may for instance be (e.g., only) supported by a beam-independent RACH configuration while beam 1 and 2 are supported by a beam-specific RACH configuration. Despite beam 3 having a higher index (3 compared to 2 and 1) than the other two beams, the corresponding RACH occasion is positioned first in the RACH resource. This type of ordering may have the advantage that UEs not supporting a beam-based random access may transmit their RA preamble without any offset in the first RACH occasion (of beam 3, e.g., thereby accessing the network node via beam 3).

Figure 3:
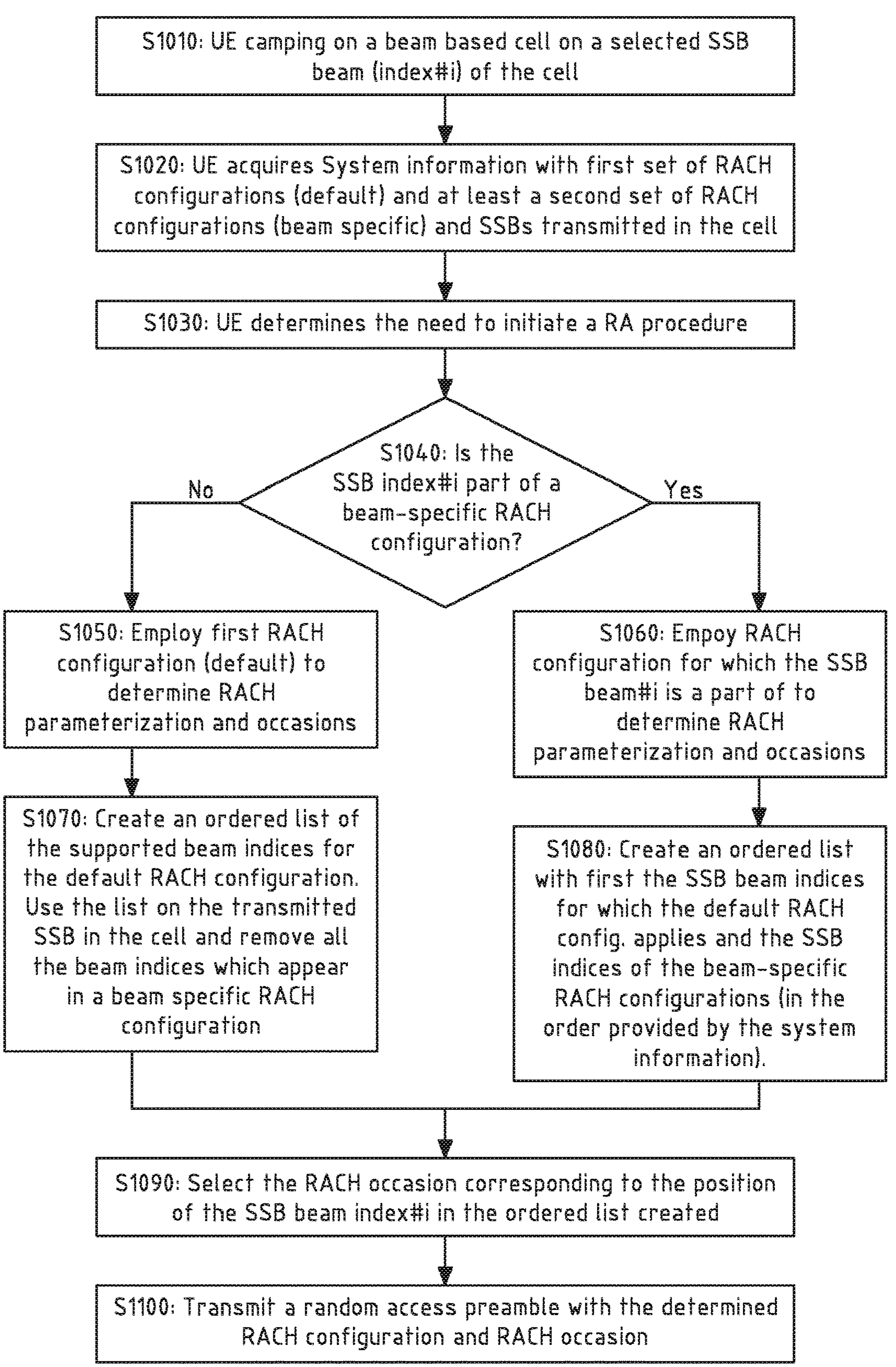
FIG. 3 a flow chart of an example embodiment according all example aspects, in particular the first example aspect.

FIG. 3 illustrates an embodiment according to all example aspects in the form of a flow chart.

In step S1010, a UE (e.g., performing a method according to the first example aspect) has for instance completed a cell selection/reselection process and has chosen a cell. During the selection/reselection process the UE may have determined a beam (e.g., an SSB beam) (beam index #i) as its serving beam for the cell. The UE (e.g., performing a method according to the first example aspect) camps on a cell. The cell may be beam based, i.e. at least two different beams may form part of the cell. The cell may be camping on a given beam, for instance a serving beam which may for instance have been selected as a best beam, for instance according to measurements, for instance measurements performed by the UE.

In step S1020, the UE acquires System information (e.g., SIB and/or MIB), for instance from a network node (e.g., performing a method according to the second example aspect). System information may include information on a first set of RACH configurations (default) and at least a second set of RACH configurations (beam-specific). A first set of RACH configurations may be beam-independent (i.e., common/default). A second set of RACH configurations may be beam-specific, e.g. to at least one beam of the beam-based cell. Further information on beams (e.g., SSB beams) transmitted in the cell and their indices may be obtained as well (e.g., as part of the (sets of) RACH configuration(s)). The first set of RACH configurations may for instance include a default parameterization for random access procedures for beams which are not included in other sets (e.g., any of the beam-specific set) of RACH configurations. The other (e.g., beam-specific) sets of RACH configurations may include different parameterizations such as different RACH formats, number of preambles or mapping of RACH occasions, RACH periodicity, RACH power ramping up etc. These beam-specific sets of RACH configurations may include an indication of beam indices for which the respective RACH configuration(s) apply.

Note that in some cases the UE may (e.g., only) receive at least one beam-specific RACH configuration and no default RACH configuration.

In step S1030, the UE may determine a need to initiate a RA procedure. For instance, the UE may have been powered on and attempts to make a first connection to the communication network. For instance, the UE intends to initiate a certain service and may require a particular beam to this end. The determination may be based on, for example, a higher layer request of the UE or in response to a paging. The RA procedure may require the UE to transmit a RA preamble to a (e.g., the) network node. The UE may further decide, which beam to use for random access. This may for instance correspond to the serving beam or to another selected beam different from the serving beam.

Step S1040 comprises determining whether the beam to be used for RA is supported by any beam-specific RACH configuration. For instance, the UE may iterate through (e.g., all) beam-specific RACH configurations obtained in one or more sets of beam-specific sets of RACH configurations and determine whether the beam is supported by any of the beam-specific RACH configurations. For instance, (e.g., every) RACH configuration or set of RACH configurations may comprise an indication of the beams supported. The UE may use this indication to determine whether a given beam is supported or not. The UE may thus determine whether the beam (e.g., its serving beam) with index #i (i=0, 1, 2, 3 . . . n−1, where n is the number of beams) is part of any beam-specific RACH configuration obtained via the System Information If the beam to be used for the RA is supported by a beam-specific RACH configuration, the embodiment may further, in step S1060, select the correct beam-specific RACH configuration supporting the beam. Using the RACH configuration, the UE may determine a RACH parametrization and a RACH occasion. I.e., if the UE's desired (e.g., selected) beam index #i is part of a beam-specific RACH configuration, the UE selects that RACH configuration to determine parameterization for access to the cell (step S1060).

In step S1080, the UE may create an ordered list of beams, e.g., of beam indices. In the shown example embodiment, the ordered list is at least partially based on RACH configurations. Beams (e.g., only) supported by a beam-independent RACH configuration are listed first and then beams supported by a beam-specific RACH configuration are listed. This corresponds to the ordering of RACH occasions shown in FIG. 2*c*. By considering beams (e.g., only) supported a beam-independent RACH configuration, an offset within the RACH resource may be derived by which the RACH occasions corresponding to beam-specific RACH configurations are offset in frequency and time. I.e., in step 1080, the UE creates an ordered list of beam indices which are part of the beam-specific RACH configuration it determined. For instance, the UE, which is using a dedicated RACH configuration, creates an ordered list, with first the SSB beam indices for which the default RACH configuration applies and then the SSB indices of the dedicated RACH configurations (in the order provided by the system information).

In case the beam is not supported by any beam-specific RACH configuration, the UE may, see step S1050, use the beam-independent RACH configuration. No offset is required in the time-frequency-domain as the beam-independent RACH occasions come first (as in FIG. 2*c*). I.e., if the UE's desired (e.g., serving) beam index #i is not part of any beam-specific RACH configuration, the UE selects the default RACH configuration.

In step S1070, an ordered list of (e.g., only) the beams supported (e.g., only) by the beam-independent RACH configuration is created. To this end, beams (beam indices) supported by any beam-specific RACH configuration may be removed (e.g., disregarded and/or discarded). I.e., the ordered list may in this case be limited to beams unsupported by any beam-specific RACH configuration. I.e., for instance, the UE, which is using a default RACH configuration, creates an ordered list including only SSB beam indices for which the default configuration applies. This is performed by the UE by using the list of transmitted SSBs obtained via the System information and eliminating from this list all beam indices which are part of a beam-specific RACH configuration.

In step S1090, the RACH occasions corresponding to the position of the beam (e.g., beam index) in the ordered list is selected for RA preamble transmission. For instance, the UE determines a RACH occasion for transmission of a RACH preamble based on the position of the SSB beam index #i in the created order list.

In step S1100, the RA preamble is transmitted in the selected RACH occasion, for instance parametrizing the RA preamble further using the determined RACH configuration.

A mapping between beam indices and RACH occasions could be based on first allocating resources for the beam-independent (default) RACH configurations which are then followed by the resources for the beam-specific (dedicated) RACH configurations. This method has the advantage that a UE not supporting dedicated RACH configurations need not process the dedicated RACH configuration parameterization to determine its RACH occasion. For instance, FIG. 3 is based on this embodiment. In this embodiment, assistance information for the mapping may be provided by the System information may for instance comprise a mapping method and/or an order in which to create the ordered list, i.e., default followed by dedicated RACH configurations.

In another embodiment (not shown), a mapping of SSB to RACH occasions could be based on SSB index (e.g., alone). In this case, a beam (e.g., SSB beam) with a lowest index is mapped to the first RACH occasion and so on or a highest index is mapped to the first RACH occasion and so on. With this method, the UE, independently of whether it is using a beam-specific RACH configuration or a (e.g., the) default RACH configuration, would need to construct for each RACH occasion an ordered list of supported RACH occasions for a given occasion and the resources mapped to each occasion to determine the RACH resources for its selected beam (e.g., SSB beam).

Note that in prior art, all SSB beams have the same RACH configuration, so if UE determines the RACH configuration for one RACH occasion it can re-use it for all other RACH occasions (e.g., as a template or offset) unless the cell updates its RACH configuration. The terminology in prior art may use the term 'RACH occasion' to refer to a specific RACH resource mapping within a specific radio frame (RACH radio frame). E.g. UE would always know the location of resources allocated to SSB #2 in FIG. 2*a* in any RACH occasion.

Figure 4:
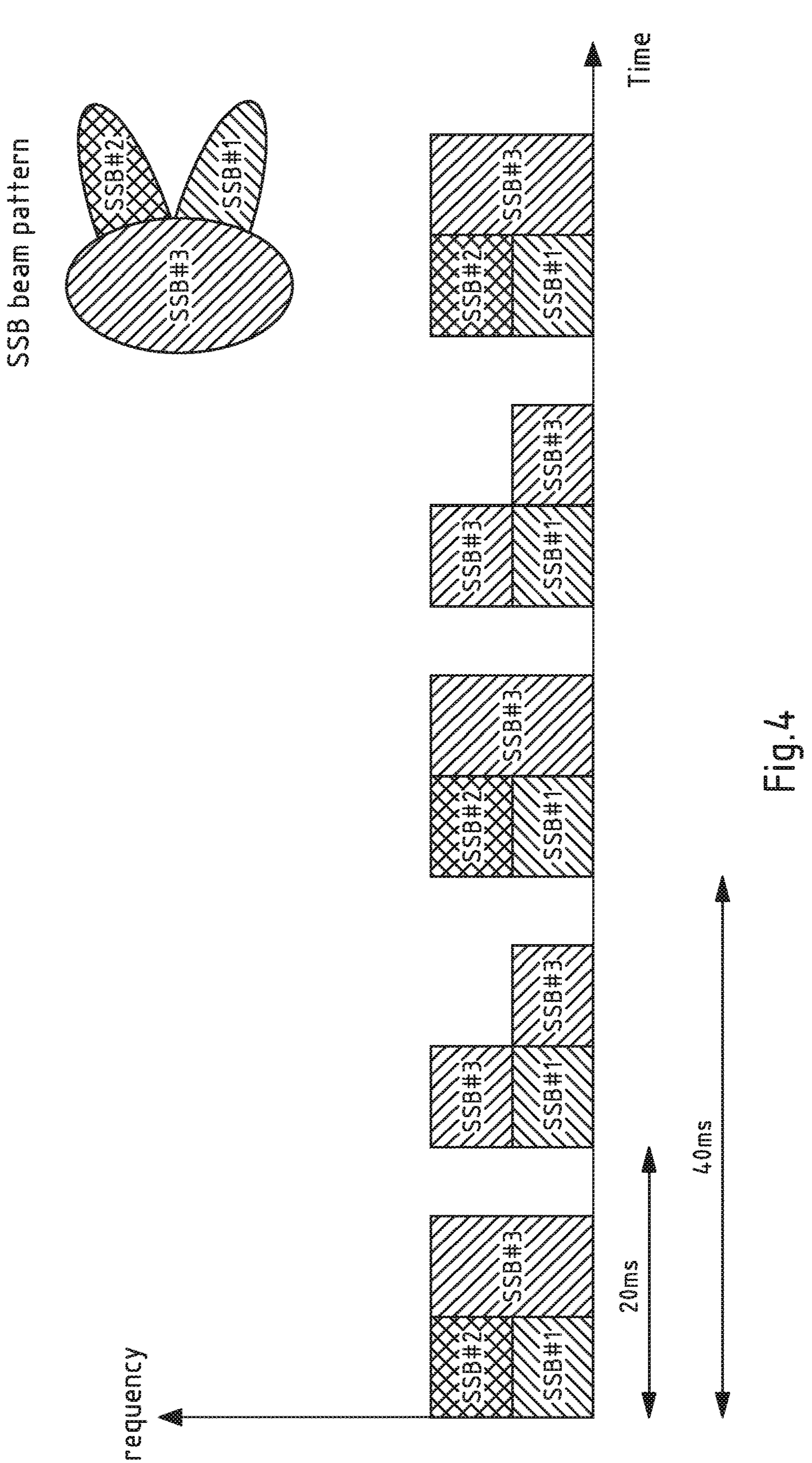
FIG. 4 an example embodiment of RACH occasions according to all example aspects.

FIG. 4 illustrates an embodiment of RACH configurations for the three example beams of FIG. 1. RACH occasions are shown over time. RACH occasions repeat over time. Noteworthily, RACH occasions for beams 1 and 3 are provided (i.e., repeatedly) in an interval of 20 ms while for beam 2, a respective RACH occasion is only provided every 40 ms. Such periodicities of RACH occasions may be configured using the RACH configurations.

For instance, with beam-specific RACH configurations, there could be beams with RACH periodicity of 40 ms while the default RACH configuration is of 20 ms (FIG. 4). This means that some beams may not have RACH resources in certain RACH radio frames (or 'occasions'). Hence the UE may need to determine a mapping between RACH and beams (e.g., SSB beams) for (e.g., all) different RACH occasion and not only RACH resources. A RACH resource allocated to a beam (e.g., an SSB beam) can change in different RACH radio frames. As shown in FIG. 4, RACH occasions for SSB #2 may only be configured every 40 ms, hence this impacts the resources (RACH occasions) allocated for SSB #3. The UE has to determine, based on the different periodicities of RACH occasions in the default and beam-specific (e.g., dedicated) configurations, where its RACH occasions are.

In this embodiment, assistance information regarding a SSB to RACH mapping, may be provided as part of the system information and may provide the UE with a method of mapping from beam (e.g., index) to RACH occasion. Additionally, assistance information may provide at least one of a formula, a method, a piece of information or combinations thereof in order to (e.g., quickly) derive a RACH occasion for a given (e.g., SSB) beam. For example, the assistance information could provide a formula to determine a RACH occasion offset from a (e.g., start of a) radio frame with a System Frame Number (SFN), e.g., SFN mod 2=0 vs SFN mod 2=1. For FIG. 4, this offset could be e.g. for SSB index larger than 2, if SFN mod 2=1 apply 32 preamble offset for preambles resources determined for SFN mod 2=0.

Figure 5:
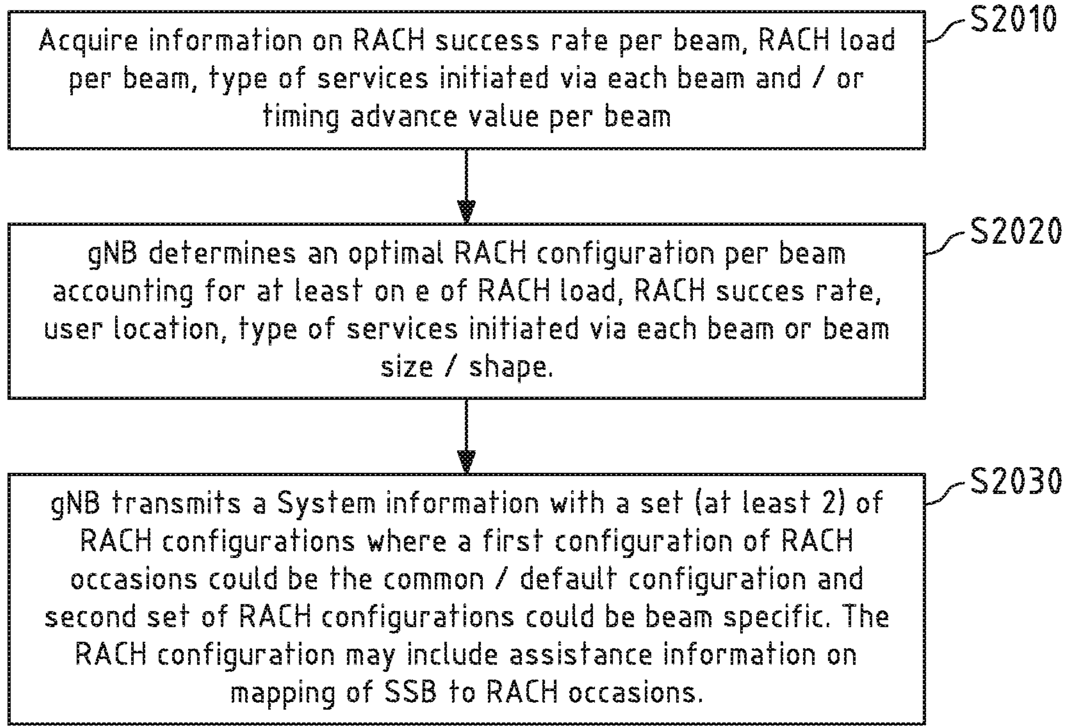
FIG. 5 a flow chart of an example embodiment according to the all example aspect, in particular the second example aspect.

FIG. 5 depicts how a network node (e.g., gNB, e.g., performing a method according to the second example aspect) may make a determination to enable more than one RACH configuration in a (e.g., single) cell. For instance, in step S2010, the network node may acquire at least one RACH performance metric such as for instance RACH success rate (e.g., per beam) and/or RACH load. The network node may additionally or alternatively acquire a type of services used by users (e.g., UEs) in respective (e.g., each) beams and/or a delay propagation for a respective (e.g., each) beam (timing advance).

In step S2020, the network node may determine to reconfigure its RACH resources (e.g., and corresponding RACH configurations to be signaled to UEs) on a beam per beam basis to ensure the beams are being employed particularly efficiently. This determination of RACH resources may be e.g. based on the beam sizes and/or beam shapes configured for a cell or a usage of the beams for random access procedures (e.g., by UEs). Traffic may not be evenly distributed across a cell (e.g., across beams). Hence, different beams may experience mutually different traffic loads. In some scenarios, the network node may determine that due to a high ghost RACH detection from a particular beam, it desires to reduce the number of RACH resources (e.g., RACH occasions) (e.g. change from 20 ms periodicity to 80 ms) for that beam, in particular when a RACH load on the respective beam is low.

In step S2030, after determining an optimal RACH configuration per beam, the network node may provide the updated access information to the UE (e.g., performing a method according to the first example aspect). This may include beam specific RACH configurations and/or assistance information, in particular on how to map SSB beams to RACH occasions.

Figure 6:
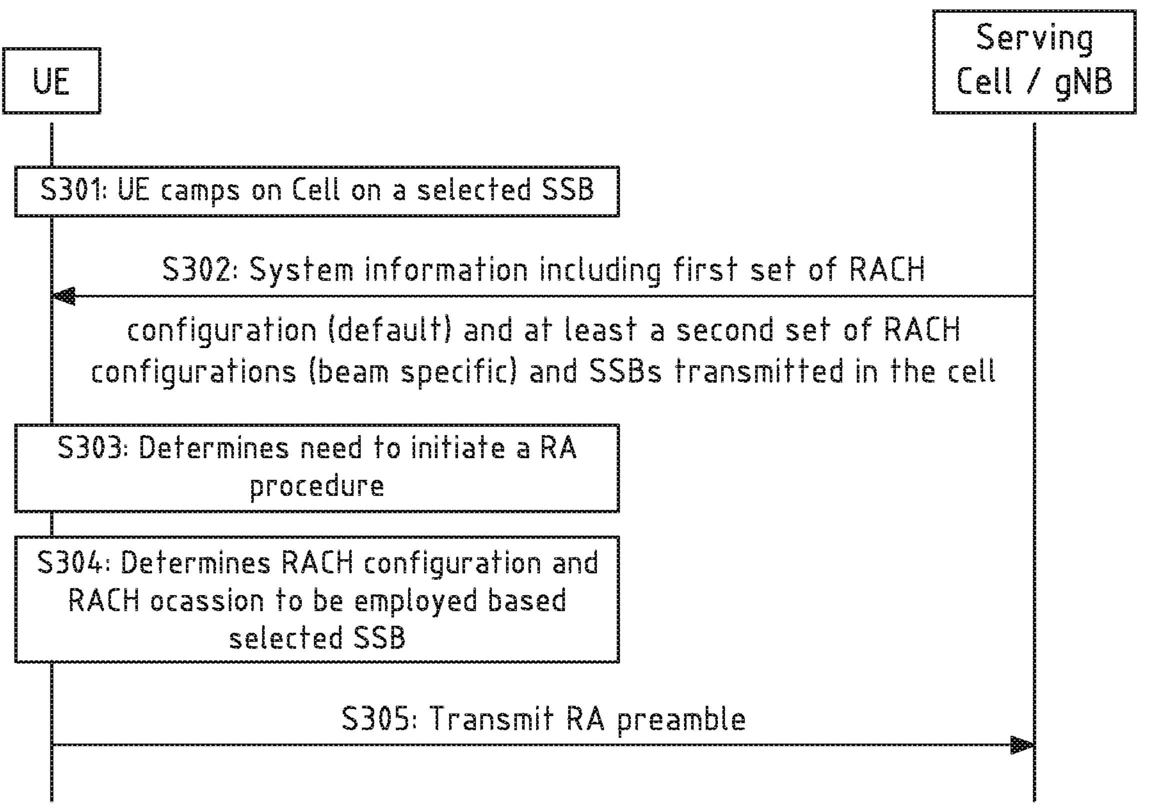
FIG. 6 a signaling diagram of an example embodiment according to all example aspects.

FIG. 6 shows a signaling diagram between a UE (e.g., performing a method according to the first example aspect) and a network node (e.g., gNB, e.g., performing a method according to the second example aspect). The UE camps on a cell provided by the network node in step S301, in particular on a serving beam (e.g., SSB). In step S302, UE receives system information from the network node including a first set and a second set of RACH configurations (one may be beam-specific and/or one may be beam-independent). In step S303, the UE may determine to initiate a RA procedure and consequently, the UE determines, in step S304, a RACH configuration and based on the RACH configuration, a RACH occasion for the selected (e.g., serving) beam. Using the RACH occasion, UE transmits, in step S305, a RA preamble in order to access the network node (i.e., the communication network via the network node).

Figure 7:
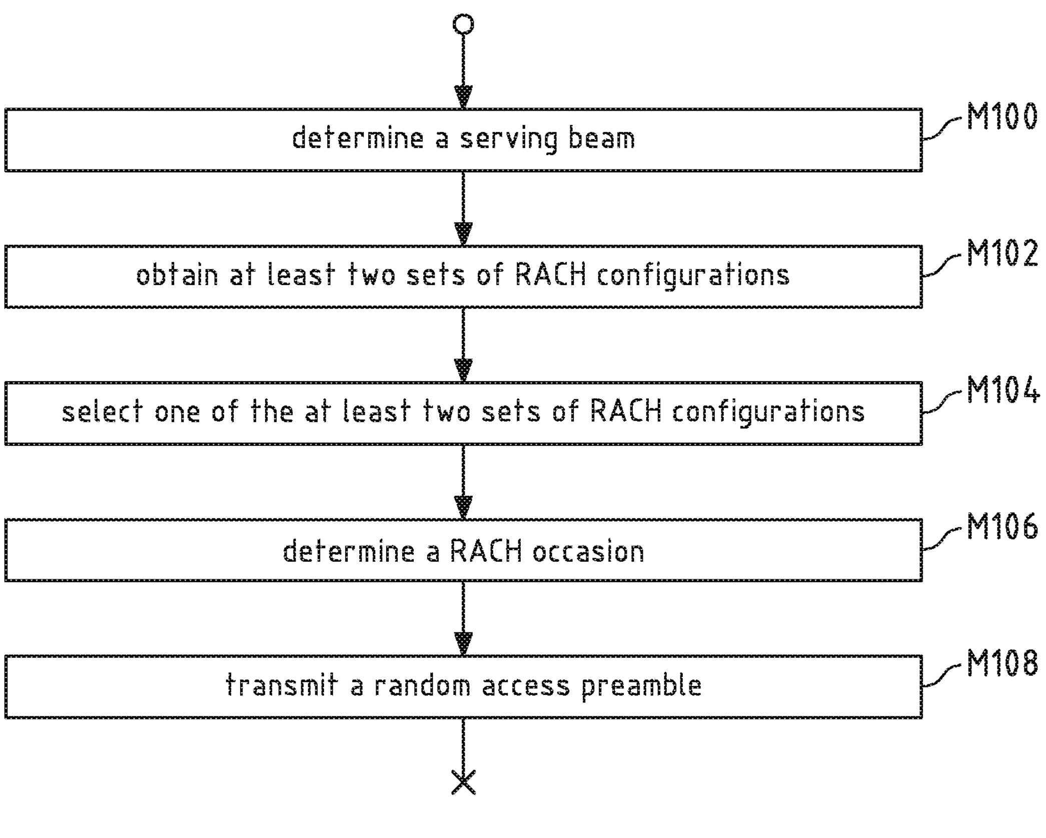
FIG. 7 a flow chart of a method according to an embodiment according to the first example aspect.

In FIG. 7, a flow chart of the method according to the first example aspect is shown. The method may be performed by a UE. In step M100, a serving beam is determined. For instance, the UE is camping on a given cell on the serving beam. The serving beam may be the best beam according to at least one criterion such as, for instance, signal strength. In step M102 at least two sets of RACH configurations are obtained of which at least one is beam-specific. One of the at least two sets of RACH configurations is selected in step M104, for instance based on the serving beam. Using the selected set of RACH configurations, a RACH occasion is determined in step M106 and in step M108, a RA preamble is transmitted in the determined RACH occasion.

Figure 8:
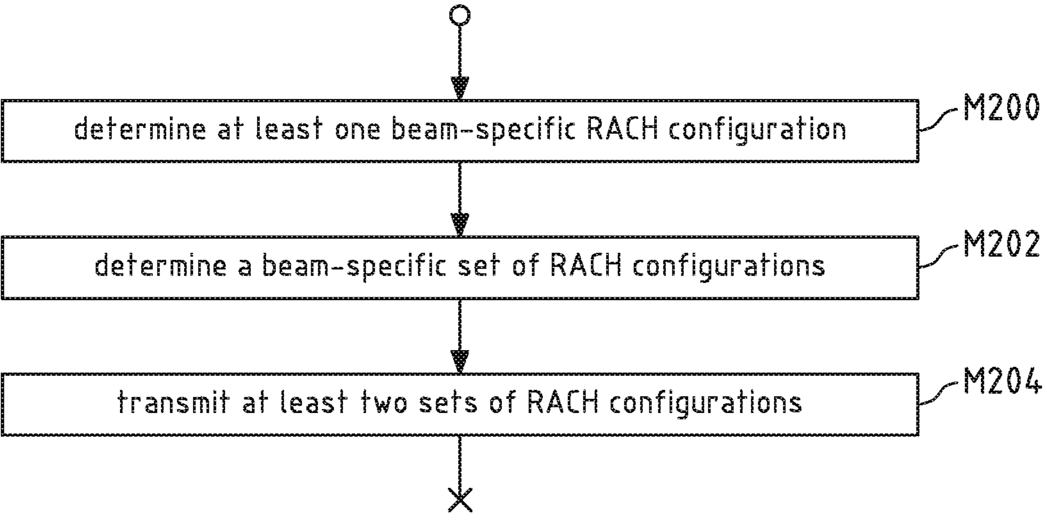
FIG. 8 a flow chart of a method according to an embodiment according to the second example aspect.

FIG. 8 shows a flow chart of a method according to the second example aspect. The method may be performed by a network node. In step M200, at least one beam-specific RACH configuration is determined. For instance, performance metrics and/or services are considered when devising the beam-specific RACH configuration. Further, in step M202, a beam-specific set of RACH-configurations is determined which comprises at least the at least one beam-specific RACH configuration determined before in step M200. The method further comprises to transmit at least two sets of RACH configurations in step M204 which comprise the determined beam-specific set of Rach configurations of step M202.

Figure 9:
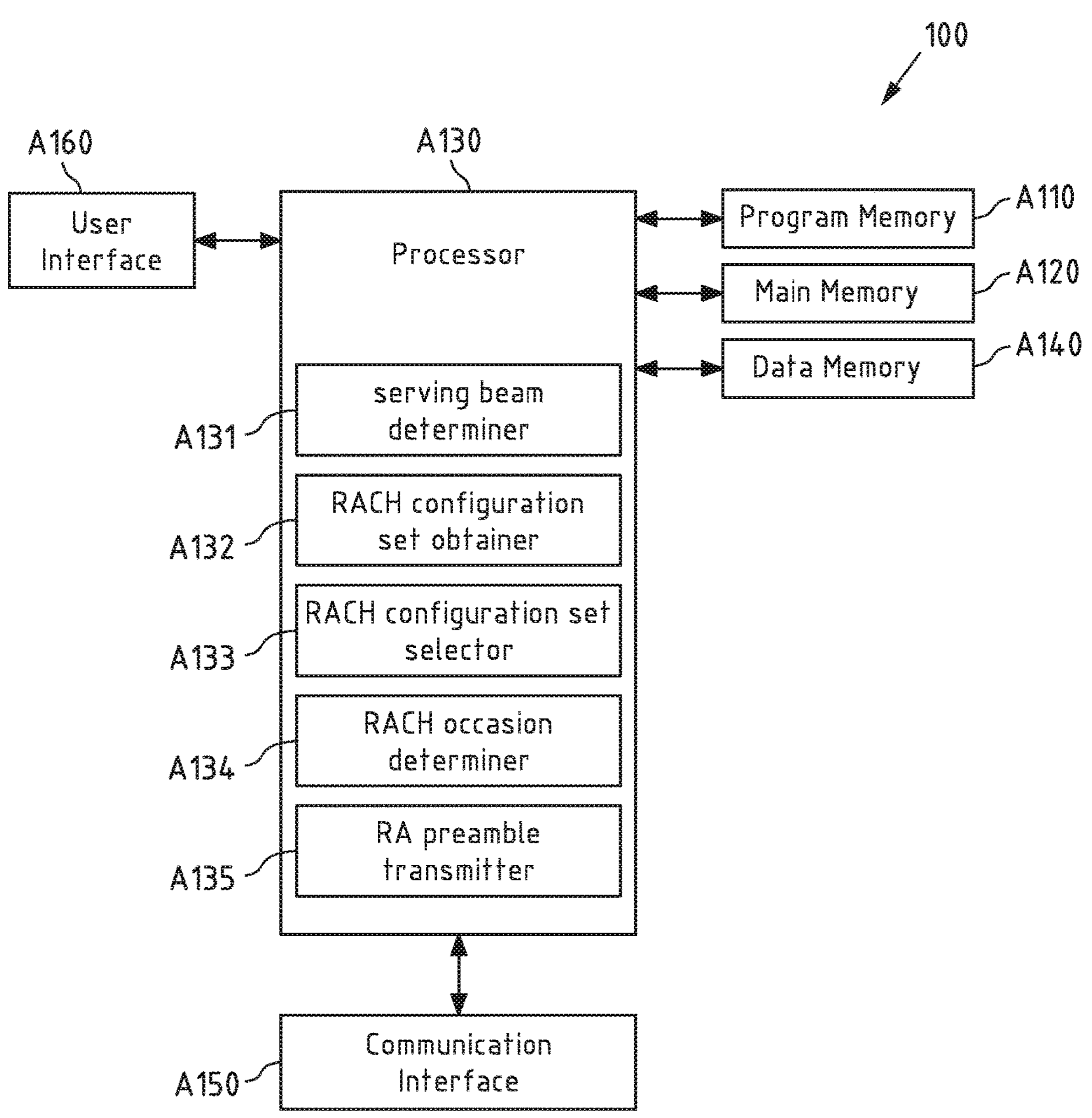
FIG. 9 a block diagram illustrating an embodiment according to the first example aspect.

FIG. 9 shows an example block diagram of a UE. The UE may perform a method according to the first example aspect. The UE may for instance be configured to perform at least a part of the actions disclosed with respect to FIG. 3, to exchange at least a part of the signalings shown in FIG. 6 with a network node (e.g., performing a method according to the second example aspect) and/or to perform the actions disclosed with respect to FIG. 8. The UE comprises a user interface A160, a program memory A110, a main memory A120, and a data memory A140. Further, it comprises a processor A130. The apparatus 100 may further comprise functional units A131 to A135 which respectively correspond to the actions as shown in the flowchart of FIG. 7. The RA preamble transmitter A135 may for instance cooperate with the communication interface A150. A functional unit may for instance correspond to a functional block within a computer code stored in a memory (e.g., program memory A110, main memory A120, and/or data memory A140) which, when executed by a processor (e.g., the processor A130), performs the respective functionality.

Figure 10:
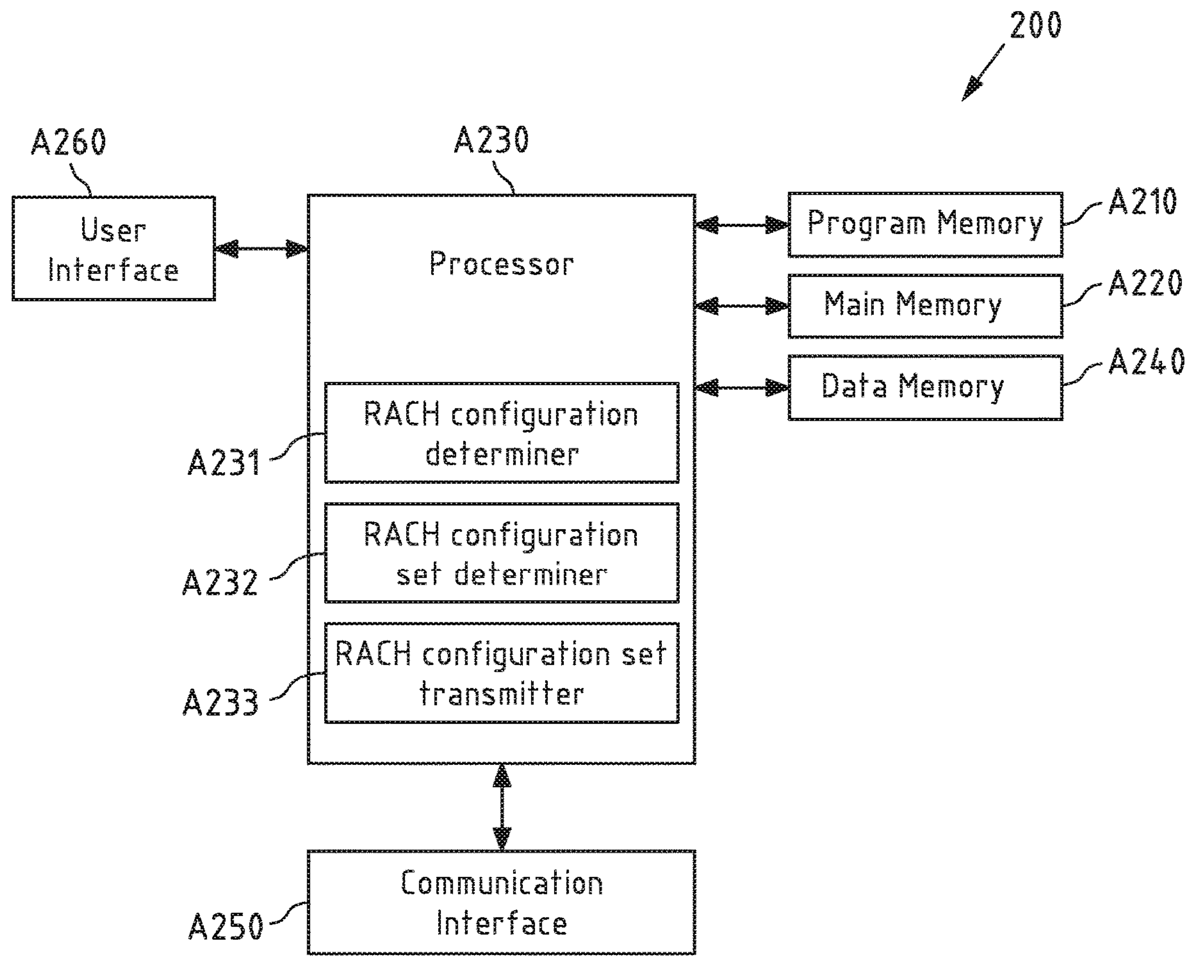
FIG. 10 a block diagram illustrating an embodiment according to the second example aspect.

FIG. 10 shows an example block diagram of a network node. The network node may perform a method according to the second example aspect. The network node may for instance be configured to perform at least a part of the actions according to FIG. 5, to exchange at least a part of the signalings shown in FIG. 6 with a UE (e.g., performing a method according the first example aspect) and/or to perform the actions disclosed with respect to in FIG. 8. The network node may comprise a user interface A260, a program memory A210, a main memory A220, and a data memory A240. Further, it comprises a processor A230. The network node 200 may further comprise functional units A231 to A233 which respectively correspond to the actions as shown in the flowchart of FIG. 8. The functional unit A233 may for instance work together with the communication interface A250. The functional units may for instance correspond to a functional block within a computer code stored in a memory (e.g., program memory A210, main memory A220, and/or data memory A240) which, when executed by a processor (e.g., the processor A230), performs the respective functionality.

Figure 11:
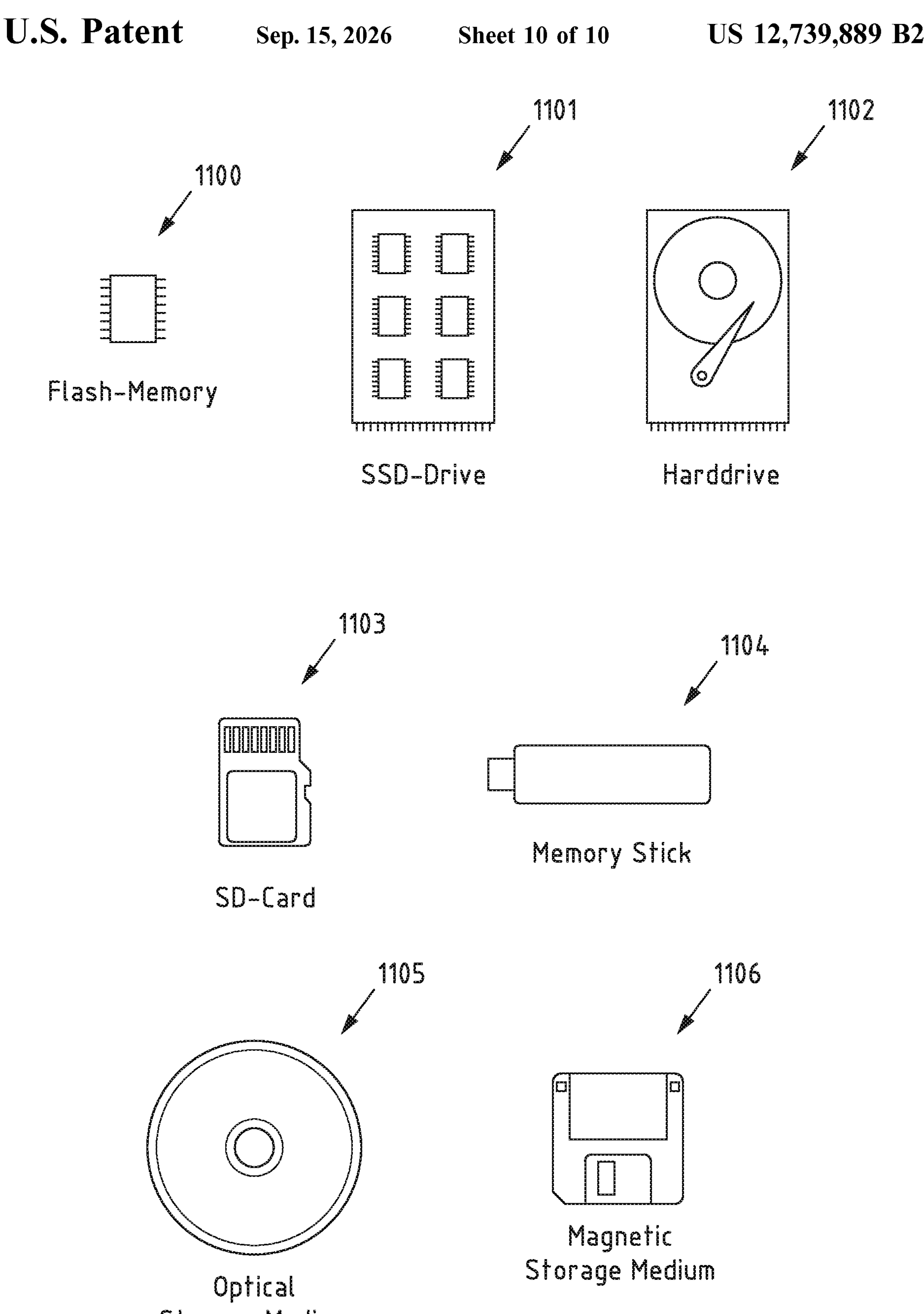
FIG. 11 examples of storage media.

FIG. 11 is a schematic illustration of examples of tangible and non-transitory computer-readable storage media according to the present invention that may for instance be used to implement program and/or main memory A110, A120, A140, A210, A220, A240 of the UE and/or the network node of FIGS. 7 and 8. FIG. 11 shows a flash memory 1100, which may for instance be soldered or bonded to a printed circuit board, a solid-state drive 1101 comprising a plurality of memory chips (e.g. Flash memory chips), a magnetic hard drive 1102, a Secure Digital (SD) card 1103, a Universal Serial Bus (USB) memory stick 1104, an optical storage medium 1105 (such as for instance a CD-ROM or DVD) and a magnetic storage medium 1106.

Some embodiments comprise:

Embodiment 1

A method, e.g., according to the first example aspect, comprising:

- determine a serving beam,
- obtain at least two sets of random access channel, RACH, configurations, wherein at least one of the at least two sets of RACH configurations is a beam-specific set of RACH configurations, wherein RACH configurations of the beam-specific set of RACH configurations are beam-specific, wherein one or more the beam-specific set of RACH configurations supports a subset of beams of a network node,
- select one of the at least two sets of RACH configurations at least partially based on a selected beam, determine a RACH occasion at least partially based on at least one of the selected set of RACH configurations or the selected beam, and transmit a random access preamble using the determined RACH occasion.

Embodiment 2

The method according to embodiment 1, wherein the selected beam is selected by the apparatus, the selected beam is selected by the apparatus based on a type of services, the selected beam is identical to the serving beam, or the selected beam is different from the serving beam.

Embodiment 3

The method according to embodiment 1 or 2, wherein the random access preamble is transmitted on the serving beam;

the random access preamble is transmitted on the selected beam;

the random access preamble is transmitted on the selected beam, wherein the selected beam is different from the serving beam or the random access preamble is transmitted on the selected beam, wherein the selected beam is different from the serving beam, wherein the selected beam is selected by the apparatus.

Embodiment 4

The method according to any of embodiments 1 to 3, wherein at least one of the at least two sets of RACH configurations is a beam-independent set of RACH configurations, wherein one or more RACH configurations of the beam-independent set of RACH configurations are beam-independent, wherein the beam-independent set of RACH configurations supports at least one of all or a majority of beams of a network node, or all beams of a network node not supported by any beam-specific RACH configuration.

Embodiment 5

The method according to any of embodiments 1 to 4, wherein at least one of the at least two sets of the RACH configurations comprises a respective indication of one or more beams supported by the respective RACH configuration.

Embodiment 6

The method according to any of embodiments 1 to 5, wherein the selection of the selected set of RACH configurations is at least partially based on a beam index of the serving beam.

Embodiment 7

The method according to any of embodiments 1 to 6, wherein the selected set of RACH configurations comprises a RACH configuration which supports the serving beam or the selected set of RACH configurations is a beam-specific set of RACH configurations.

Embodiment 8

The method according to any of embodiments 1 to 7, wherein the determination of the RACH occasion is based on an ordered list of beams supported by at least one of the selected set of RACH configurations or the obtained at least two sets of RACH configurations, and wherein the RACH occasion is determined based on the ordered list.

Embodiment 9

The method according to any of embodiments 1 to 8, the ordered list is ordered at least one of in ascending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations or in descending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations, dependently on at least one at least one of the selected set of RACH configurations, at least one of the obtained at least two sets of RACH configurations, at least one of the beam-specific sets of RACH configurations or at least one beam-independent sets of RACH configurations, or independently of at least one or any of the selected set of RACH configurations, the obtained at least two sets of RACH configurations, the beam-specific sets of RACH configurations or the beam-independent sets of RACH configurations.

Embodiment 10

The method according to any of embodiments 1 to 9, wherein the ordered list corresponds to a concatenation of a first partial ordered list of beams unsupported by any beam-specific RACH configuration of at least one of or any of the selected set of RACH configurations or at least one of or any of the obtained at least two sets of RACH configurations and a second partial ordered list of beams supported by at least one beam-specific RACH configuration of at least one of the selected set of RACH configurations or at least one of the obtained at least two sets of RACH configurations.

Embodiment 11

The method according to any of embodiments 1 to 10, wherein at least one of the RACH occasion is determined at least partially based on assistance information, or the RACH occasion is determined at least partially based on assistance information, wherein the assistance information at least one of is obtained as system information, is comprised by at least one RACH configuration, or indicates a mapping between beams and RACH occasion.

Embodiment 12

A method, e.g., according to the second example aspect, comprising:

determine at least one beam-specific random access channel, RACH, configuration for at least one beam of the apparatus, determine a beam-specific set of RACH configurations comprising the at least one determined beam-specific RACH configuration, transmit at least two sets of RACH configurations to at least one user equipment, UE, wherein the at least two sets of RACH configurations comprise the determined beam-specific set of RACH configurations.

Embodiment 13

The method according to embodiment 12, further comprising at least one of transmit assistance information to the UE or transmit assistance information to the UE, wherein the assistance information is transmitted as system information, is comprised by at least one RACH configuration, or indicates a mapping between beams and RACH occasion.

Embodiment 14

The method according to embodiment 12 or 13, further comprising:

receive a random access preamble on a RACH occasion selected at least partially based on the at least one beam-specific RACH configuration.

Embodiment 15

The method according to any of embodiments 12 to 14, wherein the at least one beam-specific RACH configuration is determined at least partially based on at least one of:

a RACH load, a RACH success rate, a UE location, a distribution of UEs a type of services, beam size, or beam shape.

Embodiment 16

The method according to any of embodiments 12 to 15, wherein the at least one of a beam-specific RACH configuration indicates at least one of a RACH format, a random access preamble length, a guard time, a number of preambles, a RACH occasion periodicity, a RACH frequency resource allocation, a RACH power control information, or a RACH procedure failure timer.

Embodiment 17

The method according to any of embodiments 12 to 16, wherein at least one of the at least two sets of RACH configurations is a beam-independent set of RACH configurations, wherein one or more RACH configurations of the beam-independent set of RACH configurations are beam-independent, wherein the beam-independent set of RACH configurations supports at least one of all or a majority of beams of a network node, or all beams of a network node not supported by any beam-specific RACH configuration.

Embodiment 18

The method according to any of embodiments 12 to 17, wherein at least one of the at least two sets of the RACH configurations comprises a respective indication of one or more beams supported by the respective RACH configuration.

Embodiment 19

A first apparatus, for instance a UE, comprising respective means for performing the method of any of Embodiments 1 to 11.

Embodiment 20

An first apparatus, for instance a UE, comprising at least one processor; and at least one memory storing instructions that, when executed by the at least one processor, cause the apparatus at least to perform and/or control the method according any of embodiments 1 to 11.

Embodiment 21

A second apparatus, for instance a network node, comprising respective means for performing the method of any of embodiments 12 to 18.

Embodiment 22

A second apparatus, for instance a network node, comprising at least one processor; and at least one memory storing instructions that, when executed by the at least one processor, cause the apparatus at least to perform and/or control the method according any of embodiments 12 to 18.

Embodiment 23

A computer program, the computer program when executed by a processor causing an apparatus, e.g. the apparatus according to embodiment 19 or 20, to perform and/or control the actions and/or steps of the method of any of embodiments 1 to 11.

Embodiment 24

A computer program product comprising a computer program according to embodiment 23.

Embodiment 25

A computer program, the computer program when executed by a processor causing an apparatus, e.g. the apparatus according to embodiment 21 or 22, to perform and/or control the actions and/or steps of the method of any of embodiments 12 to 18.

Embodiment 26

A computer program product comprising a computer program according to embodiment 25.

Embodiment 27

A system comprising:
- at least one first apparatus according to any of the embodiments 19 or 20, and
- at least one second apparatus according to any of the embodiments 21 or 22.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Having the same meaning as the expression "A and/or B", the expression "at least one of A or B" may be used herein. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are (e.g., only) examples, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of (e.g., only) one of the enumerated features is possible. The specific combination of all subsequently enumerated features may as well be considered. Also, a plurality of (e.g., only) one of the enumerated features may be possible.

The sequence of all method actions presented above is not mandatory, also alternative sequences may be possible. Nevertheless, the specific sequence of method actions exemplarily shown in the figures shall be considered as one possible sequence of method actions for the respective embodiment described by the respective figure.

The subject-matter has been described above by means of example embodiments. It should be noted that there are alternative ways and variations which are obvious to a skilled person in the art and can be implemented without deviating from the scope of the appended claims.

List of Abbreviations

FR Frequency Range
NR New Radio
OFDM Orthogonal Frequency Division Duplex
PDCCH Physical Downlink Control Channel
PRACH Physical Random Access Control Channel
PUCCH Physical Uplink Control Channel
RA Random Access
RACH Random Access Control Channel
RAT Radio Access Technology
SSB System Synchronization Block
UE User Equipment

The invention claimed is:

1. An apparatus comprising:
at least one processor; and
at least one memory storing instructions that, when executed by the at least one processor, cause the apparatus at least to:
determine a serving beam;
obtain at least two sets of random access channel, RACH, configurations, wherein at least one of the at least two sets of RACH configurations is a beam-specific set of RACH configurations, wherein one or more RACH configurations of the beam-specific set of RACH configurations are beam-specific, wherein the beam-specific set of RACH configurations supports a subset of beams of a network node;
select one of the at least two sets of RACH configurations at least partially based on a selected beam;
determine a RACH occasion based on an ordered list of beams supported by at least one of the selected set of RACH configurations or the obtained at least two sets of RACH configurations, wherein the ordered list corresponds to a concatenation of a first partial ordered list of beams unsupported by any beam-specific RACH configuration of at least one of or any of the selected set of RACH configurations or at least one of or any of the obtained at least two sets of RACH configurations and a second partial ordered list of beams supported by at least one beam-specific RACH configuration of at least one of the selected set of RACH configurations or at least one of the obtained at least two sets of RACH configurations; and transmit a random access preamble using the determined RACH occasion.

2. The apparatus according to claim 1, wherein the selected beam is selected by the apparatus, the selected beam is selected by the apparatus based on a type of services, the selected beam is identical to the serving beam, or the selected beam is different from the serving beam.

3. The apparatus according to claim 1, wherein the random access preamble is transmitted on the serving beam, the random access preamble is transmitted on the selected beam, the random access preamble is transmitted on the selected beam, wherein the selected beam is different from the serving beam, or the random access preamble is transmitted on the selected beam, wherein the selected beam is different from the serving beam, wherein the selected beam is selected by the apparatus.

4. The apparatus according to claim 1, wherein at least one of the at least two sets of RACH configurations is a beam-independent set of RACH configurations, wherein one or more RACH configurations of the beam-independent set of RACH configurations are beam-independent, wherein the beam-independent set of RACH configurations supports at least one of:

all or a majority of beams of a network node, or all beams of a network node not supported by any beam-specific RACH configuration.

5. The apparatus according to claim 1, wherein at least one of the at least two sets of the RACH configurations comprises a respective indication of one or more beams supported by the respective RACH configuration.

6. The apparatus according to claim 1, wherein the selection of the selected set of RACH configurations is at least partially based on a beam index of the serving beam.

7. The apparatus according to claim 1, wherein at least one of the selected set of RACH configurations comprises a RACH configuration which supports the serving beam or the selected set of RACH configurations is a beam-specific set of RACH configurations.

8. The apparatus according to claim 1, wherein the ordered list is ordered at least one of:

in ascending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations, or in descending order of beam indices of beams supported by at least one RACH configuration of at least one of the selected set of RACH configurations, at least one of the obtained at least two sets of RACH configurations, at least one of the beam-specific sets of RACH configurations or at least one of the beam-independent sets of RACH configurations, dependently on at least one at least one of the selected set of RACH configurations, at least one of the obtained at least two sets of RACH configurations, at least one of the beam-specific sets of RACH configurations or at least one beam independent sets of RACH configurations, or-independently of at least one or any of the selected set of RACH configurations, the obtained at least two sets of RACH configurations, the beam-specific sets of RACH configurations or the beam-independent sets of RACH configurations.

9. The apparatus according to claim 1, wherein at least one of:

the RACH occasion is determined at least partially based on assistance information, or the RACH occasion is determined at least partially based on assistance information, wherein the assistance information at least one of:

is obtained as system information, is comprised by at least one RACH configuration, or indicates a mapping between beams and RACH occasion.

10. A system comprising a first apparatus and a second apparatus, the first apparatus comprising:

at least one processor; and at least one memory storing instructions that, when executed by the at least one processor, cause the first apparatus at least to:

determine a serving beam;

obtain at least two sets of random access channel, RACH, configurations, wherein at least one of the at least two sets of RACH configurations is a beam-specific set of RACH configurations, wherein RACH configurations of the beam-specific set of RACH configurations are beam-specific, wherein the beam-specific RACH configurations support a subset of beams of a network node;

select one of the at least two sets of RACH configurations at least partially based on the serving beam;

determine a RACH occasion based on an ordered list of beams supported by at least one of the selected set of RACH configurations or the obtained at least two sets of RACH configurations, wherein the ordered list corresponds to a concatenation of a first partial ordered list of beams unsupported by any beam-specific RACH configuration of at least one of or any of the selected set of RACH configurations or at least one of or any of the obtained at least two sets of RACH configurations and a second partial ordered list of beams supported by at least one beam-specific RACH configuration of at least one of the selected set of RACH configurations or at least one of the obtained at least two sets of RACH configurations; and transmit a random access preamble using the determined RACH occasion; and the second apparatus comprising:

at least one processor; and at least one memory storing instructions that, when executed by the at least one processor, cause the second apparatus at least to:

determine at least one beam-specific RACH configuration for at least one beam of the second apparatus;

determine a beam-specific set of RACH configurations comprising the at least one determined beam-specific RACH configuration;

transmit at least two sets of RACH configurations to at least one user equipment, UE, wherein the at least two sets of RACH configurations comprise at least one of the determined at least one beam-specific set of RACH configurations.

* * * * *